(12) United States Patent
Galchenko et al.

(10) Patent No.: US 11,206,150 B2
(45) Date of Patent: Dec. 21, 2021

(54) CONTROLLER WITH AUTOMATIC FIELD BUS PROTOCOL DETECTION

(71) Applicant: Johnson Controls Technology Company, Auburn Hills, MI (US)

(72) Inventors: Sergey A. Galchenko, Mequon, WI (US); Eric W. Hamber, New Berlin, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 7 days.

(21) Appl. No.: 16/204,926

(22) Filed: Nov. 29, 2018

(65) Prior Publication Data

US 2020/0177409 A1  Jun. 4, 2020

(51) Int. Cl.
*H04L 12/28* (2006.01)

(52) U.S. Cl.
CPC ........ *H04L 12/2807* (2013.01); *H04L 12/283* (2013.01); *H04L 2012/285* (2013.01)

(58) Field of Classification Search
None
See application file for complete search history.

(56) References Cited

U.S. PATENT DOCUMENTS

| | | | | |
|---|---|---|---|---|
| 6,581,100 B1* | 6/2003 | Durin | .................. | G06F 13/4054 370/236 |
| 6,678,751 B1* | 1/2004 | Hays | .................. | H04L 25/0262 709/217 |
| 7,778,262 B2* | 8/2010 | Beagley | .................. | H04W 4/18 370/401 |
| 9,960,962 B2 | 5/2018 | Hamber et al. | | |
| 2004/0117166 A1* | 6/2004 | Cassiolato | ......... | G05B 19/4185 703/13 |
| 2006/0067209 A1* | 3/2006 | Sheehan | ........... | H04L 29/08846 370/216 |
| 2007/0183449 A1* | 8/2007 | Beagley | .................. | H04L 69/18 370/466 |
| 2014/0344427 A1* | 11/2014 | Coleman | ............. | H04L 41/0886 709/222 |
| 2017/0317915 A1* | 11/2017 | Ritmanich | .......... | H04L 12/2803 |
| 2020/0073848 A1* | 3/2020 | Goekjian | ............ | G06F 13/4286 |

* cited by examiner

*Primary Examiner* — Brian S Roberts
(74) *Attorney, Agent, or Firm* — Foley & Lardner LLP

(57) ABSTRACT

A controller for equipment includes a communications interface, a communications protocol manager, a protocol detection manager, and an equipment controller. The communications interface connects to at least one of a serial bus and a wireless communications device. The communications protocol manager communicates via at least one of the serial bus and the wireless communications device according to a communications protocol and a predetermined parameter. The protocol detection manager causes the communications protocol manager to test for multiple communications protocols and predetermined parameters to identify a communications protocol and parameter used by at least one of the serial bus and the wireless communications device. The equipment controller uses the identified communications protocol and parameter to generate protocol-specific control signals or communication signals for the equipment and use the protocol-specific control signals or communication signals to control the equipment or communicate with the equipment.

18 Claims, 15 Drawing Sheets

CONTROLLER WITH AUTOMATIC FIELD BUS PROTOCOL DETECTION

BACKGROUND

The present disclosure relates generally to communication protocols for controllers. More specifically, the present disclosure relates to automatic communication protocol detection techniques.

SUMMARY

One implementation of the present disclosure is a controller for equipment, according to some embodiments. The controller includes a communications interface, a communications protocol manager, a protocol detection manager, and an equipment controller, according to some embodiments. The communications interface is connected to at least one of a serial bus and a wireless communications device, according to some embodiments. In some embodiments, the communications protocol manager is configured to communicate via at least one of the serial bus and the wireless communications device according to a communications protocol and a predetermined parameter. In some embodiments, the protocol detection manager is configured to cause the communications protocol manager to test for multiple predefined communications protocols and predetermined parameters to identify a communications protocol and parameter used by at least one of the serial bus and the wireless communications device. In some embodiments, the equipment controller is configured to use the identified communications protocol and parameter of at least one of the serial bus and the wireless communications device to generate protocol-specific control signals or communication signals for the equipment and use the protocol-specific control signals or communication signals to control the equipment or communicate with the equipment.

In some embodiments, the communications protocol manager includes a set of master protocols and a set of slave protocols. In some embodiments, the master protocols are communications protocols for which the controller is a master device and the slave protocols are communications protocols for which the controller is a slave device.

In some embodiments, the communications protocol manager further includes a set of the predetermined parameter for each of the slave protocols and master protocols.

In some embodiments, the protocol detection manager is configured to transition the controller into a slave device mode and perform a slave protocol test for each of the slave protocols to identify the communications protocol used by at least one of the serial bus and wireless communications device.

In some embodiments, the protocol detection manager is configured to transition the controller into a master device mode and perform a master protocol test for each of the master protocols to identify the communications protocol used by at least one of the serial bus and wireless communications device.

In some embodiments, the slave protocol test includes selecting one of the slave communications protocols and one of the predetermined parameters, configuring the controller to communicate according to the selected slave communications protocols and the selected predetermined parameter, receiving data through the communications interface, and determining if the received data corresponds to the selected slave communications protocol and the selected predetermined parameter. In some embodiments, the slave protocol test includes storing the selected slave communications protocol and predetermined parameter if it is determined that the received data corresponds to the selected slave communications protocol and the selected predetermined parameter.

In some embodiments, the slave protocol test includes selecting another of the predetermined parameters, reconfiguring the controller to communicate according to the selected slave communications protocol with the other selected predetermined parameter, and repeating the steps of receiving data, determining if the received data corresponds to the slave communications protocol and the predetermined parameter, selecting another of the predetermined parameters, and reconfiguring the controller, until all of the predetermined parameters have been tested for the selected slave communications protocol, or until the selected slave communications protocol and the selected predetermined parameter are determined to correspond to the received data.

In some embodiments, the master protocol test includes selecting one of the master communications protocols and one of the predetermined parameters, configuring the controller to communicate according to the selected master communications protocol and predetermined parameter, waiting a predetermined amount of time, sending a protocol request to the at least one of the serial bus and the wireless communications device through the communications interface, waiting a predetermined amount of time for a protocol response, receiving the protocol response through the communications interface, determining if the received protocol response corresponds to the selected master communications protocol and the selected predetermined parameter. In some embodiments, the master protocol test includes storing the selected master communications protocol and the selected predetermined parameter if the received protocol response corresponds to the selected master communications protocol and the selected predetermined parameter. In some embodiments, the master protocol test includes selecting another of the predetermined parameters, reconfiguring the controller to communicate according to the selected master communications protocol and the other selected predetermined parameter, and repeating the steps of waiting the predetermined amount of time, sending the protocol request, waiting the predetermined amount of time, determining if the received protocol response corresponds to the selected master communications and the selected predetermined parameter, storing the selected master communications protocol and the selected predetermined parameter, and selecting another of the predetermined parameters until all of the predetermined parameters have been tested for the selected master communications protocol, or until the selected master communications protocol and the selected predetermined parameter are determined to correspond to the received protocol response.

Another implementation of the present disclosure is a method for determining a communications protocol and one or more datalink parameters of a serial communications system for a controller connected to the serial communications system, according to some embodiments. In some embodiments, the method includes performing a slave communications protocol detection test for each of one or more predefined slave communications protocols. In some embodiments, the slave communications protocol detection test includes transitioning the controller into a slave device mode and receiving information from the serial communications system to identify the communications protocol and one or more datalink parameters used by the serial communications system. In some embodiments, if the communications protocol and one or more datalink parameters of the serial communications system are not determined by performing the slave communications protocol detection test, the method includes performing a master communications protocol detection test for each of one or more predefined master communications protocols. In some embodiments, the master communications protocol detection test includes transitioning the controller into a master device mode and sending a protocol request to the serial communications system and waiting for a response from the serial communications system to identify the communications protocol and one or more datalink parameters of the serial communications system. In some embodiments, the method includes configuring the controller to communicate with the serial communications system according to the identified communications protocol and one or more datalink parameters, if either of the slave communications protocol detection test or the master communications protocol detection test identify the communications protocol and one or more datalink parameters used by the serial communications system. In some embodiments, the method includes using the determined communications protocol and one or more datalink parameters to generate protocol-specific control signals or communication signals for equipment and use the protocol-specific control signals or communication signals to control the equipment or communicate with the equipment.

In some embodiments, the set of one or more datalink parameters is at least one of a baud rate, a parity, a number of data bits, and start/stop bits.

In some embodiments, the slave communications protocol detection test further includes selecting a slave communications protocol and a set of one or more datalink parameters, configuring the controller to communicate according to the selected slave communications protocols and the set of one or more datalink parameters, receiving data from the serial communications system, and determining if the received data corresponds to the selected slave communications protocol and the selected set of the one or more datalink parameters. In some embodiments, if the received data corresponds to the selected slave communications protocol and the selected set of the one or more datalink parameters, the slave communications protocol detection test further includes storing the selected slave communications protocol and the selected set of the one or more datalink parameters, communicating with the serial communications system according to the selected slave communications protocol and the selected set of the one or more datalink parameters, and ending the slave communications protocol detection test. In some embodiments, if the received data does not correspond to the selected slave communications protocol and the selected set of the one or more datalink parameters, the slave communications protocol detection test further includes selecting another set of one or more datalink parameters, and repeating the steps of configuring the controller, receiving data, determining if the received data corresponds to the selected slave communications protocol and the selected set of the one or more datalinks, until either a list of sets of the one or more datalink parameters are exhausted or the received data corresponds to the selected slave communications protocol and the selected set of one or more datalink parameters.

In some embodiments, the slave communications protocol detection test further includes waiting for a predetermined time duration to receive data from the serial communications system.

In some embodiments, the slave communications protocol detection test further includes waiting for and receiving additional data from the serial communications system if a required amount of data is not received, in response to determining that the received data corresponds to the selected slave communications protocol and the selected set of the one or more datalink parameters.

In some embodiments, storing the selected slave communications protocol and the selected set of the one or more datalink parameters further includes saving the selected slave communications protocol and the selected set of the one or more datalink parameters as a last active protocol for future use.

In some embodiments, the master communications protocol detection test includes selecting a master communications protocol and a set of one or more datalink parameters, configuring the controller to communicate according to the selected master communications protocols and the selected set of the one or more datalink parameters, receiving any data from the serial communications system for a time duration, sending a protocol request in response to the time duration ending, receiving a protocol response from the serial communications system, and determining if the received protocol response corresponds to the selected master communications protocol and the selected set of the one or more datalink parameters. In some embodiments, if the received protocol response corresponds to the selected master communications protocol and the selected set of the one or more datalink parameters, the master communications protocol detection test includes storing the selected master communications protocol and the selected set of the one or more datalink parameters, communicating with the serial communications system according to the selected slave communications protocol and the selected set of the one or more datalink parameters, and ending the master communications protocol detection test. In some embodiments, if the received protocol response does not correspond to the selected master communications protocol and the selected set of the one or more datalink parameters, the master communications protocol detection test includes selecting another set of one or more datalink parameters, and repeating the steps of configuring the controller, sending the protocol request, receiving the protocol response, determining if the received protocol response corresponds to the selected slave communications protocol and the selected set of the one or more datalink parameters, and selecting another set of one or more datalink parameters, until either a list of sets of the one or more datalink parameters are exhausted or the received protocol response corresponds to the selected master communications protocol and the selected set of the one or more datalink parameters.

In some embodiments, the time duration includes a predetermined time amount and a random time amount.

In some embodiments, storing the selected master communications protocol and the selected set of the one or more datalink parameters includes saving the selected master communications protocol and the set of one or more datalink parameters as a last active protocol for future use.

In some embodiments, the master communications protocol detection test further includes determining if the protocol request is successfully sent in response to sending the protocol request.

In some embodiments, the method is performed by the controller in response to at least one of the controller being started, the controller being connected to the serial communications system, and a manual command to initiate the method.

In some embodiments, the serial communications system is at least one of a system bus and a wireless communications device.

In some embodiments, the controller is configured to communicably connect with the serial communications system with an RS-485 interface.

DETAILED DESCRIPTION

Overview

Figure 1:
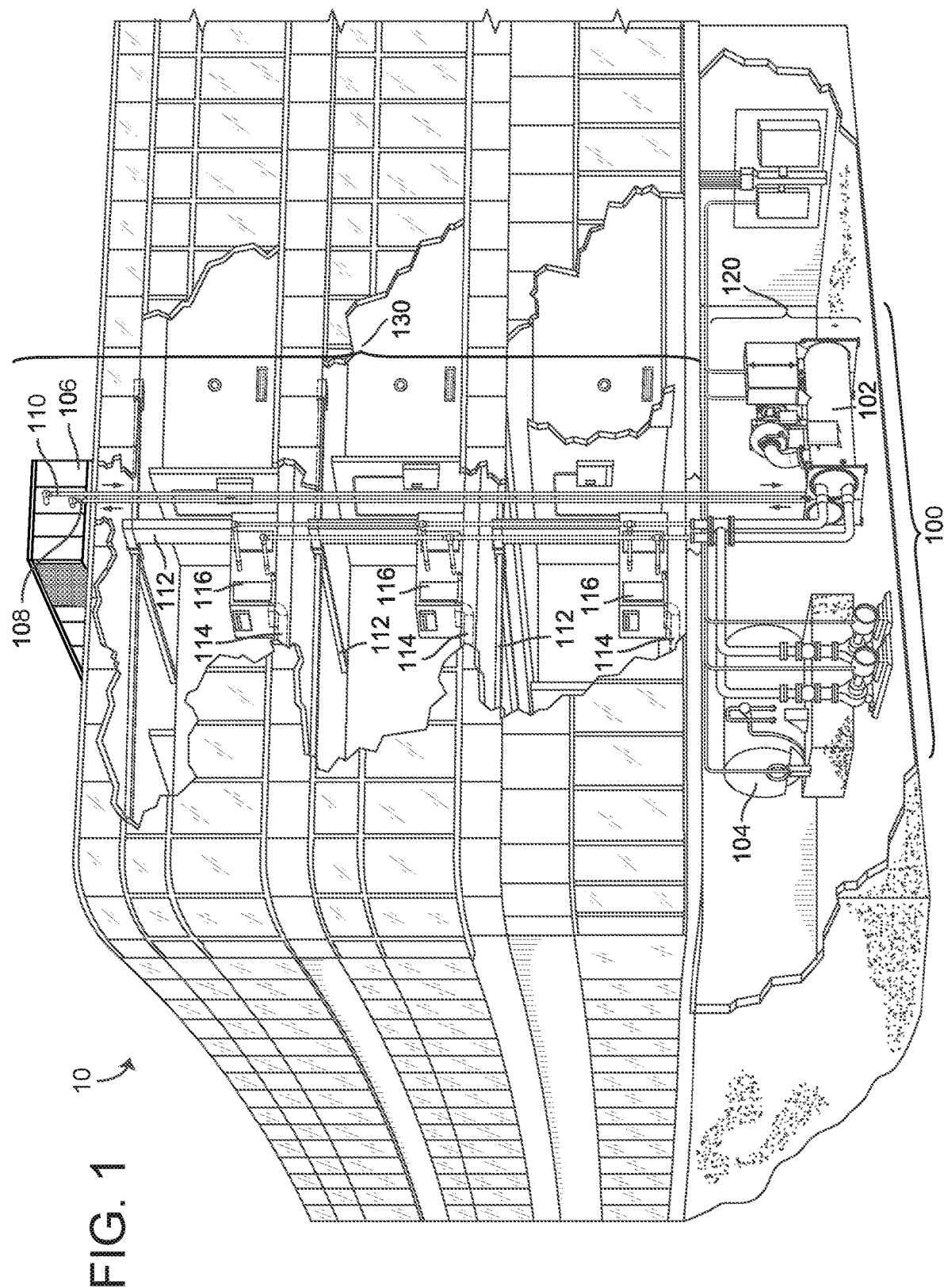
FIG. 1 is a drawing of a building equipped with a building automation system (BAS) which includes a heating, ventilating, or air conditioning (HVAC) system, according to some embodiments.

Referring generally to the FIGURES, an automatic communications protocol and datalink process is shown, according to some embodiments. Many building automation systems include multiple field controllers which may be connected, disconnected, and reconnected to a system bus. In order to communicate with the building automation system, the field controllers must be appropriately configured with a communications protocol and datalink parameters. In some cases, the field controllers may be manually configured and the communications protocol and datalink parameters may be manually set. However, the system bus may be reconfigured such that the communications protocol and/or the datalink parameters are different. In order for the field controllers to communicate with the building automation system, the field controllers must also be reconfigured to the appropriate communications protocol and/or the datalink parameters. Advantageously, the automatic communications protocol and datalink detection process reduces the likelihood of erroneously configured field controllers which may occur if the field controllers are manually configured, according to some embodiments.

The number and type of devices connected to the system bus may vary, as well as the type of communication protocols used. The exact type of protocol may depend on the types of connected equipment, installation site configuration, network topology, etc., and many other parameters. Many field controllers can support a number of communication protocols and a number of various datalink parameters. In some cases, field controllers may use hardware components such as DIP switches for selecting a particular communications protocol.

The various communications protocols which the field controllers may support can be divided into a first group and a second group. The first group includes any communications protocols which require the field controller to be in a slave mode, and the second group includes any communications protocols which require the field controller to be in a master mode (e.g., wireless communication), according to some embodiments. The automatic communication protocol and datalink detection process first groups the possible communications protocols into these two groups, according to some embodiments. The process then may transition the field controller into the slave mode to test the communications protocols in the first group. Each combination of communications protocols and datalink parameters are tested by configuring the field controller to communicate with each combination of communications protocols and datalink parameters of the first group, and determining if meaningful data is received by the field controller. If a sufficient amount of meaningful data is received by the field controller for one of the combinations of communications protocols and datalink parameters, the correct communications protocol and datalink parameters of the system to which the field controller is connected have been identified.

If none of the communications protocols of the first group are identified, the field controller may transition into the master mode. For each possible combination of communications protocols and datalink parameters, the field controller sends a protocol request packet, according to some embodiments. If the field controller receives a protocol response, the field controller may identify that the communications protocol and datalink parameters used to send the protocol request are the communications protocol and datalink parameters used by the system to which the field controller is connected, according to some embodiments.

Building Automation System and HVAC System

Referring now to FIGS. 1-4, a building automation system (BAS) and HVAC system in conjunction with which the systems and methods of the present invention can be implemented are shown, according to some embodiments. Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. Examples of a waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
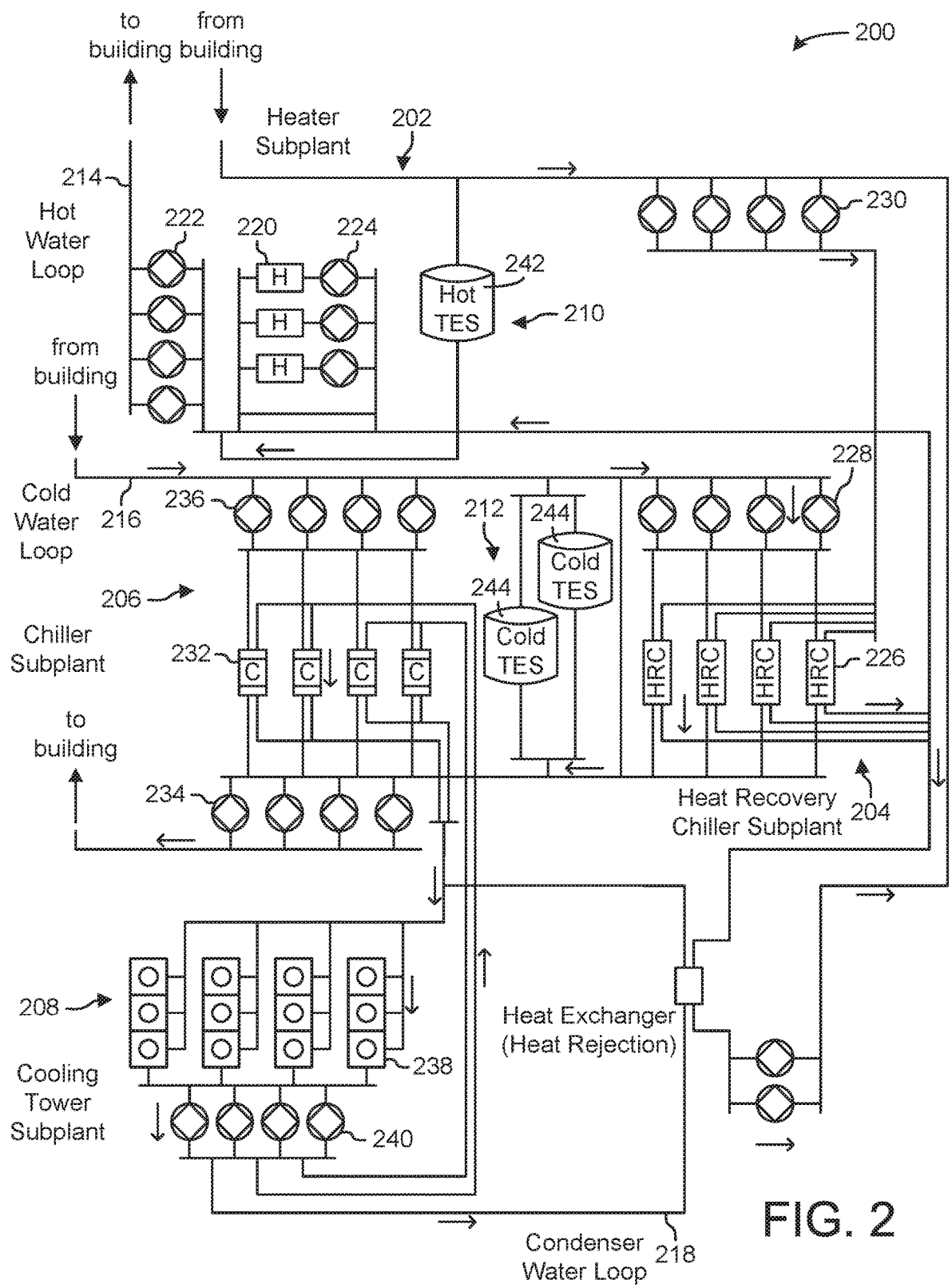
FIG. 2 is a schematic diagram of a waterside system which can be used to serve the building of FIG. 1, according to some embodiments.

Referring now to FIG. 2, a block diagram of a waterside system 200 is shown, according to some embodiments. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
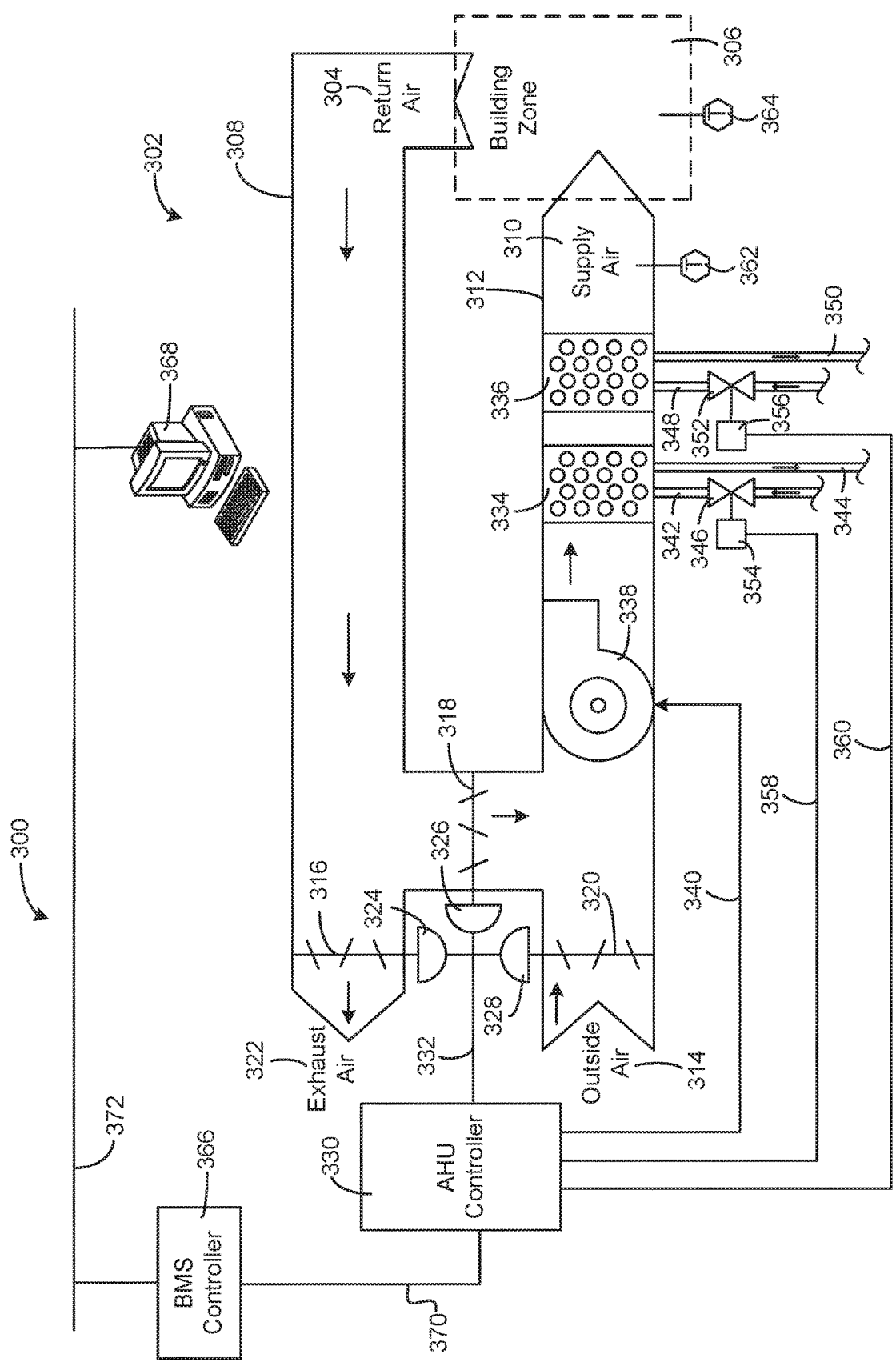
FIG. 3 is a block diagram of an airside system which can be used to serve the building of FIG. 1, according to some embodiments.

Referring now to FIG. 3, a block diagram of an airside system 300 is shown, according to some embodiments. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 can provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS controller 366 and/or AHU controller 330 via communications link 372.

Figure 4:
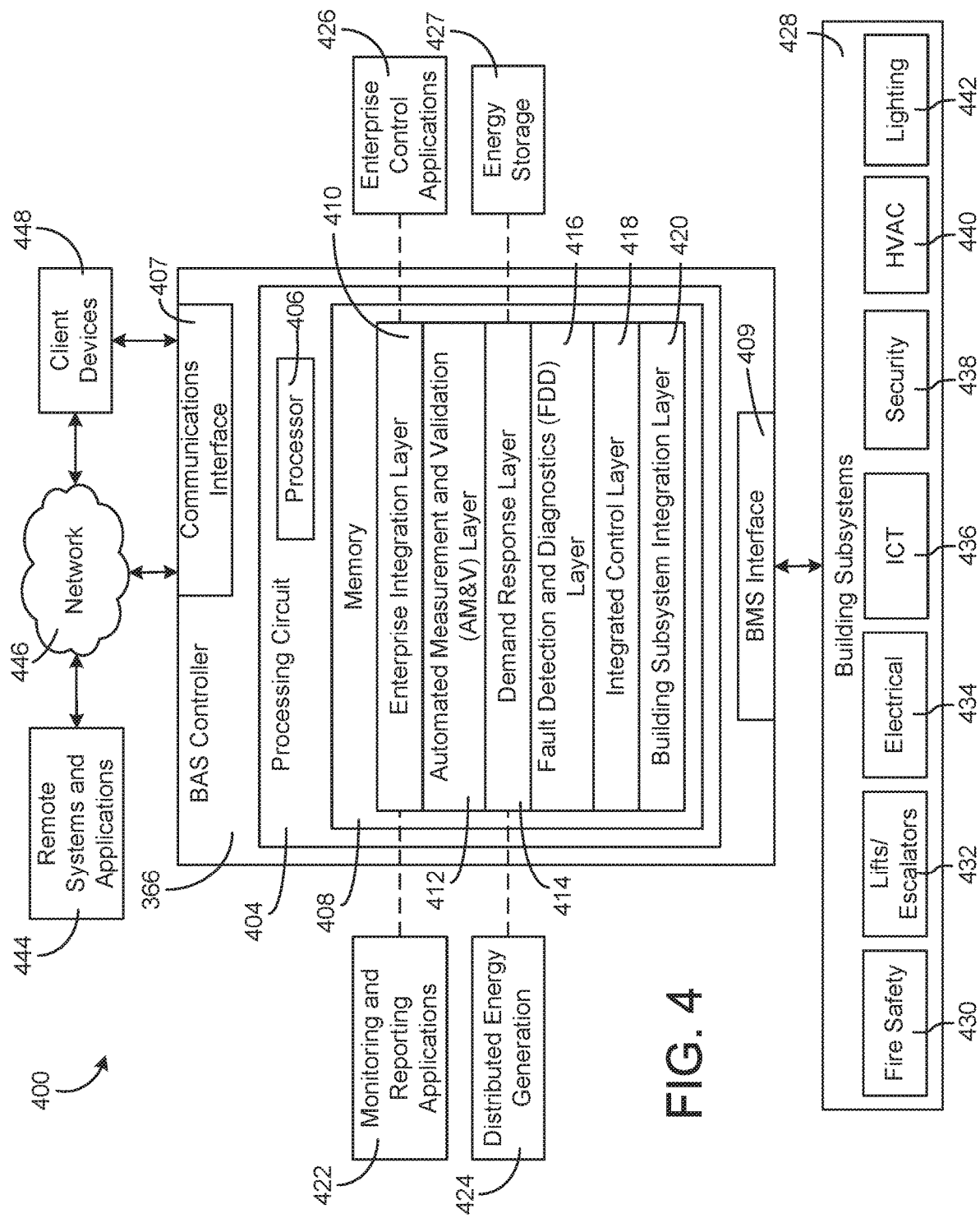
FIG. 4 is a block diagram of a BAS which can be used in conjunction with the building of FIG. 1, according to some embodiments.

Referring now to FIG. 4, a block diagram of a building automation system (BAS) 400 is shown, according to some embodiments. BAS 400 can be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In some embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Alternative Energy System

Figure 5:
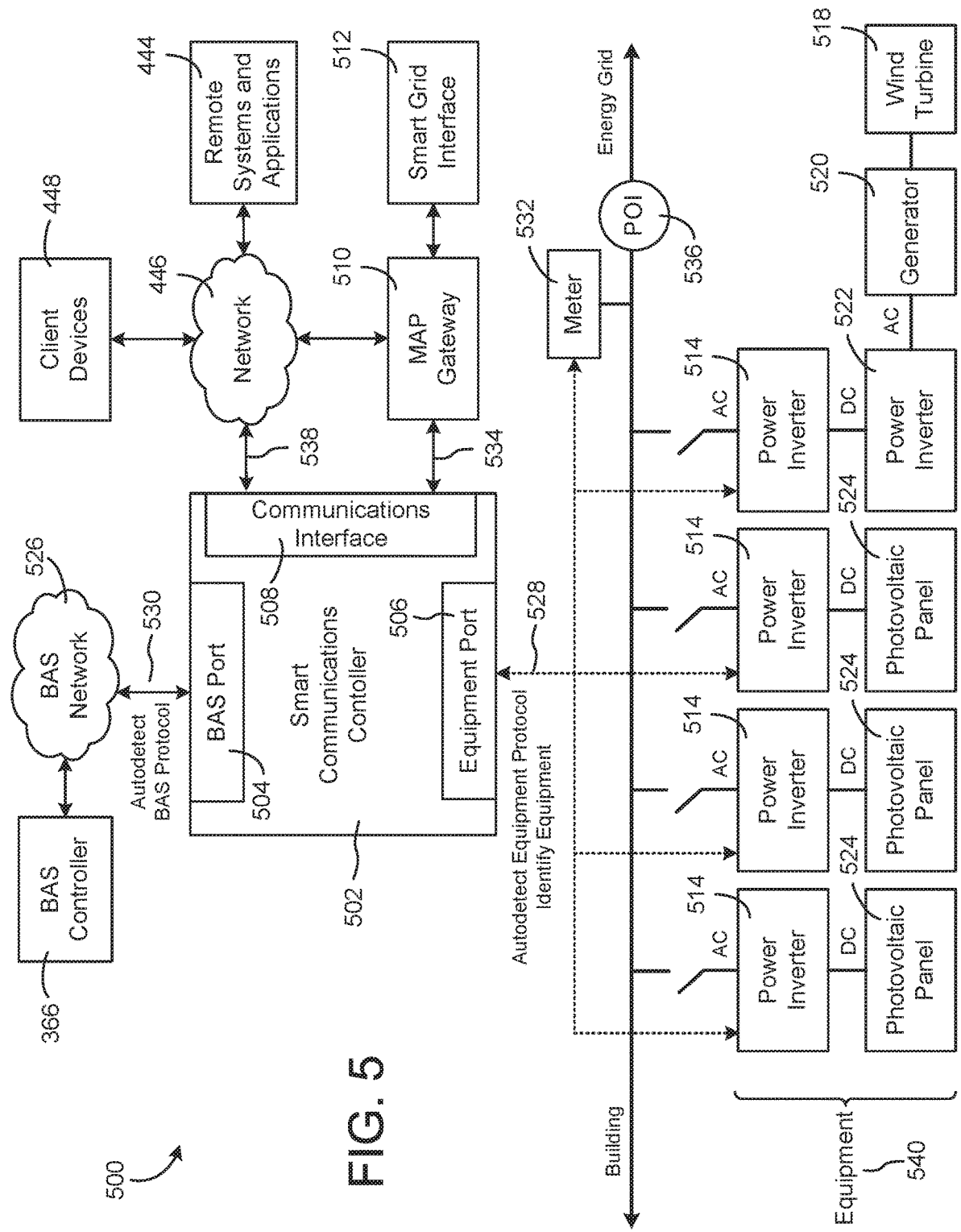
FIG. 5 is a block diagram of an alternative energy system including a smart communications controller which can be used to automatically determine a communications protocol used by connected equipment of the alternative energy system, according to some embodiments.

Referring now to FIG. 5, an alternative energy system 500 is shown, according to some embodiments. In brief overview, system 500 converts renewable energy (e.g., wind energy, solar energy, etc.) and other alternative forms of energy into electricity. The electricity generated by system 500 can be used locally by system 500 (e.g., used to power components of system 500), provided to a building or campus connected to system 500, supplied to a regional energy grid, and/or stored in a battery. System 500 can use battery storage to perform load shifting and/or ramp rate control. Battery storage can also be used to perform frequency regulation.

System 500 is shown to include equipment 540. Equipment 540 can include any type of equipment capable of use in an energy system. For example, equipment 540 is shown to include several photovoltaic (PV) panels 524, a wind turbine 518, a generator 520, a power inverter 522 connected to generator 520, and several power inverters 514 connected to an energy grid. Equipment 540 can also include a meter 532 configured to measure a total power provided by power inverters 514 to a point of interconnection 536.

Each of PV panels 524 can include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel can include a plurality of linked photovoltaic cells. The solar panels may combine to form a photovoltaic array.

PV panels 524 can have any of a variety of sizes and/or locations. In some embodiments, PV panels 524 are part of a large-scale photovoltaic power station (e.g., a solar park or farm) capable of providing an energy supply to a large number of consumers. When implemented as part of a large-scale system, PV panels 524 can cover multiple hectares and can have power outputs of tens or hundreds of megawatts. In other embodiments, PV panels 524 can cover a smaller area and may have a relatively lesser power output (e.g., between one and ten megawatts, less than one megawatt, etc.). For example, PV panels 524 can be part of a rooftop-mounted system capable of providing enough electricity to power a single home or building. It is contemplated that PV panels 524 can have any size, scale, and/or power output, as can be desirable in different implementations.

PV panels 524 can generate a direct current (DC) output that depends on the intensity and/or directness of the sunlight to which PV panels 524 are exposed. The directness of the sunlight may depend on the angle of incidence of the sunlight relative to the surfaces of PV panels 524. The intensity of the sunlight can be affected by a variety of environmental factors such as the time of day (e.g., sunrises and sunsets) and weather variables such as clouds that cast shadows upon PV panels 524.

In some embodiments, PV panels 524 are configured to maximize solar energy collection. For example, PV panels 524 can include a solar tracker (e.g., a GPS tracker, a sunlight sensor, etc.) that adjusts the angle of PV panels 524 so that the PV panels 524 are aimed directly at the sun throughout the day. The solar tracker can allow PV panels 524 to receive direct sunlight for a greater portion of the day and may increase the total amount of power produced by PV panels 524. In some embodiments, PV panels 524 include a collection of mirrors, lenses, or solar concentrators configured to direct and/or concentrate sunlight on PV panels 524. The energy generated by PV panels 524 can be stored in a battery or provided to an energy grid.

Wind turbine 518 converts mechanical energy into electricity using generator 520. Generator 520 is driven by wind turbine 518 and produces an alternating current (AC) power output. The AC power output is converted to DC power by power inverter 522 and provided to one of power inverters 514. Although only solar and wind power equipment are shown in FIG. 5, it is contemplated that alternative energy system 500 can generate power using any type of renewable energy source (e.g., solar, wind, geothermal, hydroelectric, bio energy, etc.) or alternative energy source. Equipment 540 can include any type of system or device configured to facilitate collecting, converting, storing, providing, measuring, or otherwise facilitating the functions of alternative energy system 500. For example, equipment 540 can include geothermal energy collection devices, hydroelectric generators, or other types of equipment configured to supplement or replace PV panels 524 and wind turbine 518 in other types of alternative energy systems.

Power inverters 514 are configured to convert the DC output of PV panels 524 and power inverter 522 into an AC output that can be fed into the energy grid or used by a local (e.g., off-grid) electrical network. For example, power inverters 514 can be solar inverters or grid-tie inverters configured to convert the DC output from PV panels 524 into a sinusoidal AC output synchronized to the grid frequency of the energy grid. In some embodiments, power inverters 514 receive a cumulative DC output from PV panels 524. For example, power inverters 514 can be string inverters or central inverters. In other embodiments, power inverters 514 include a collection of micro-inverters connected to each PV panels 524 (as shown in FIG. 5) or solar cell.

Power inverters 514 can receive the DC power output from PV panels 524 and convert the DC power output to an AC power output that can be fed into the energy grid. Power inverters 514 can synchronize the frequency of the AC power output with that of the energy grid (e.g., 50 Hz or 60 Hz) using a local oscillator and may limit the voltage of the AC power output to no higher than the grid voltage. In some embodiments, power inverters 514 are resonant inverters that include or use LC circuits to remove the harmonics from a simple square wave in order to achieve a sine wave matching the frequency of the energy grid. In various embodiments, power inverters 514 can operate using high-frequency transformers, low-frequency transformers, or without transformers. Low-frequency transformers can convert the DC output from PV panels 524 directly to the AC output provided to the energy grid. High-frequency transformers may employ a multi-step process that involves converting the DC output to high-frequency AC, then back to DC, and then finally to the AC output provided to the energy grid.

Power inverters 514 can be configured to perform maximum power point tracking and/or anti-islanding. Maximum power point tracking can allow power inverters 514 to produce the maximum possible AC power from PV panels 524. For example, power inverters 514 can sample the DC power output from PV panels 524 and apply a variable resistance to find the optimum maximum power point. Anti-islanding is a protection mechanism that immediately shuts down power inverters 514 (i.e., preventing power inverters 514 from generating AC power) when the connection to an electricity-consuming load no longer exists. In some embodiments, power inverters 514 perform ramp rate control by limiting the power generated by PV panels 524.

The power provided to the energy grid or received from the energy grid can monitored at the point of interconnection 536 by a meter 532. The rate charged by a power utility may depend on a variety of factors such as total energy consumption, peak demand, and/or power factor at the point of interconnection 536. Total energy consumption can be calculated by graphing a site's power consumption (kW) over time (hours). The total energy consumption (kilowatt hours or kWh) is the area under the curve. This is the charge that most residential customers are familiar with.

The demand is instantaneous power (kW) at the point of interconnection 536 at any moment in time. The peak demand is the maximum on the power consumption graph. Some utilities charge a separate "demand charge" based on the peak demand and/or the time of day the peak demand was reached. For example, the demand charge ($ per unit power) can be higher during peak times and lower during non-peak times. An energy utility can use the demand charge to encourage less power consumption during peak times to ensure they have the capacity (more power plants and larger conductors) to deliver the required amount of power throughout the day.

Power factor is an indication of how much reactive power (VARS) a system needs supplied or absorbed in relation to the real power needed. Power factor indicates how effectively real power is transferred. Reactive power is an important component to maintaining a consistent voltage on the electrical grid. An energy utility can use extra capacity and equipment to accommodate and regulate this reactive power. In some embodiments, power inverters 514 are configured to supply reactive power in addition to real power and can control to a given power factor or reactive power reference.

A site with alternative energy generation can reduce its energy bill in several ways. These include, for example reducing the total energy (kWh) needed from the utility, reducing the peak real power (kW) needed from the utility since some of the power needed by the site comes from the PV or wind system, and correcting the power factor for the site. A site owner can monitor and control equipment 540 to accomplish any of these objectives. Monitoring equipment 540 can include accumulating and trending the total energy of power inverters 514 in kilowatt hours and monitoring the temperature and fault status of each power inverter 514. Control of power inverters 514 can include disconnecting a power inverter 514 when large grid disturbances are detected and adjusting the reactive power supplied by power inverters 514 to help stabilize the grid voltage. Keeping the building's power factor near unity limits the surcharges imposed by the utility.

Other ways that alternative energy system 500 can be operated to reduce energy cost include controlling ramp rate at the point of interconnection 536 and participating in frequency regulation programs. Ramp rate is defined as the rate at which the power at the point of interconnection 536 changes. The power output of PV panels 524 can be intermittent and can vary abruptly throughout the course of a day. For example, a down-ramp (i.e., a negative change) in PV output power may occur when a cloud passes over a PV field. An up-ramp (i.e., a positive change) in PV output power may occur at sunrise and at any time during the day when a cloudy sky above the PV field clears up. This intermittency in PV power output presents a problem to the stability of the energy grid. In order to address the intermittency of PV output power, ramp rate control is often used to maintain the stability of the grid.

Ramp rate control is the process of offsetting PV ramp rates that fall outside of compliance limits determined by the electric power authority overseeing the grid. Ramp rate control typically requires the use of an energy source that allows for offsetting ramp rates by either supplying additional power to the grid or consuming more power from the grid. Stationary battery technology can be used for such applications. Stationary battery technology can also be used for frequency regulation, which is the process of maintaining the grid frequency at a desired value (e.g. 60 Hz in the United States) by adding or removing energy from the grid as needed.

Several examples of ramp rate control and frequency regulation which can be performed by alternative energy system 500 are described in U.S. Provisional Patent Application No. 62/239,131 titled "Systems and Methods for Controlling Ramp Rate in a Photovoltaic Energy System," U.S. Provisional Patent Application No. 62/239,231 titled "Central Plant With Price-Based and Incentive-Based Demand Response Optimization," U.S. Provisional Patent Application No. 62/239,233 titled "Frequency Response Optimization Controller," U.S. Provisional Patent Application No. 62/239,245 titled "Frequency Regulation and Ramp Rate Controller," U.S. Provisional Patent Application No. 62/239,246 titled "Energy Storage Controller With Battery Life Model," and U.S. Provisional Patent Application No. 62/239,249 titled "Low Level Frequency Response Optimization Controller," all of which were filed Oct. 8, 2015. Each of these applications is incorporated by reference herein in its entirety.

A site owner may desire to monitor and control equipment 540 through a building automation system (e.g., BAS 400). However, some power inverters do not support the BACnet protocol or any other type of building automation system protocol. Some power inverters support the Modbus protocol, but are not directly compatible with BAS networks. Programmable Logic Controllers (PLCs) can be used to control power inverters 514 in real-time (e.g., down to the millisecond), but can be difficult to interface with a BAS. Alternative energy system 500 solves this problem using smart communications controller 502 and MAP gateway 510.

Still referring to FIG. 5, alternative energy system 500 is shown to include a smart communications controller 502. Controller 502 is shown to include a BAS port 504 and an equipment port 506. In some embodiments, BAS port 504 and equipment port 506 are serial ports (e.g., RS-232 or RS-485 serial ports) or other types of serial communications interfaces. In other embodiments, BAS port 504 and equipment port 506 can be parallel ports or other types of non-serial communications interfaces. BAS port 504 and equipment port 506 can include wired or wireless communications interfaces (e.g., jacks, antennas, transmitters, receivers, transceivers, wire terminals, etc.) for conducting data communications with BAS network 526 and equipment 540, respectively.

Equipment port 506 can be connected to equipment 540 via an equipment communications link 528. Different types of equipment 540 can be configured to communicate using different equipment communications protocols. For example, some types of equipment 540 can be configured to communicate using the Modbus Master communications protocol, the DNP3 protocol, the IEC-60870-5 protocol, the IEC-61850 protocol, or a proprietary communications protocol. Other types of equipment 540 can be configured to communicate using a master/slave token passing (MSTP) communications protocol (i.e., a BACnet datalink-level token ring protocol). In some embodiments, controller 502 includes multiple equipment ports 506. Each equipment port 506 can be connected to a different type and/or instance of equipment 540. The equipment 540 connected to each equipment port 506 can be configured to communicate using the same communications protocol or different communications protocols.

Advantageously, smart communications controller 502 can be configured to automatically detect the communications protocol(s) used by the connected equipment 540. Controller 502 can be configured to automatically identify the connected equipment 540 (e.g., by equipment type, name, model, etc.) and select an appropriate equipment model based on the identity of the connected equipment 540. Controller 502 can use the selected equipment model and the detected communications protocol to generate protocol-specific control signals for the connected equipment 540. Controller 502 can provide the protocol-specific control signals to equipment 540 via equipment port 506.

BAS port 504 can be connected to BAS network 526 via a BAS communications link 530. BAS network 526 can be configured to communicate using any of a variety of BAS communications protocols. For example, BAS network 526 can use the MSTP communications protocol, the Modbus Slave communications protocol, the N2 Slave communications protocol, the ZigBee communications protocol, or various other BAS communications protocols (e.g., META-SYS®, BACnet, LonTalk, etc.). Controller 502 can be configured to automatically detect the BAS communications protocol used by BAS network 526. Controller 502 can translate between the BAS communications protocol and the equipment communications protocols to enable communications between BAS network 526 and equipment 540.

In some embodiments, smart communications controller 502 includes a communications interface 508. Communications interface 508 can be a connected services port. Communications interface 508 can include wired or wireless communications interfaces (e.g., jacks, antennas, transmitters, receivers, transceivers, wire terminals, etc.) for conducting data communications with network 446, client devices 448, MAP gateway 510, or other external systems or devices (e.g., remote systems and applications 444). Communications interface 508 can be configured to communicate directly with such external systems or devices (e.g., local wired or wireless communications) or via communications network 446 (e.g., a WAN, the Internet, a cellular network, etc.). In some embodiments, communications interface 508 includes an Ethernet card and port for sending and receiving data via an Ethernet-based communications link or network. In some embodiments, communications interface 508 is a power line communications interface. In some embodiments, communications interface 508 includes a WiFi transceiver, Bluetooth transceiver, NFC transceiver, cellular transceiver, or other wireless transceiver for communicating via a wireless communications network.

Communications interface 508 can be connected to network 446 via communications link 538 and to MAP gateway 510 via communications link 534. Network 446 and MAP gateway 510 can be configured to communicate using any of a variety of communications protocols. For example, network 446 can be a WiFi network (e.g., a building LAN) configured to use the IEEE 802.11 communications protocol, an Ethernet network configured to use an Ethernet communications protocol, a cellular network configured to use a cellular communications protocol, an Internet network configured to use a TCP/IP communications protocol, or any other type of network configured to use any other type of communications protocol. MAP gateway 510 can connect to communications interface 508 via network 446 or directly. MAP gateway 510 can communicate directly with communications interface 508 using any of a variety of wired or wireless communications protocols (e.g., WiFi direct, NFC, Bluetooth, Ethernet, etc.).

Smart communications controller 502 can be configured to act as a translation layer between the native communications protocols of the equipment 540 connected to equipment port 506 (e.g., Modbus Master, DNP3, IEC-60870-5, IEC-61850, a proprietary equipment protocol, etc.), the BAS protocol used by the BAS network 526 connected to BAS port 504 (e.g., MSTP, Modbus Slave, N2 Slave, ZigBee, etc.), and/or the external communications protocol used by the external systems or devices connected to communications interface 508 (e.g., Ethernet, WiFi, cellular, etc.). In some embodiments, controller 502 includes a plurality of datalink objects (DLOs). Each datalink object can be configured to handle communications using a particular communications protocol.

Advantageously, smart communications controller 502 can be configured to automatically detect the communications protocols used by the equipment 540 connected to equipment port 506, the BAS network 526 connected to BAS port 504, and/or the external devices connected to communications interface 508. In some embodiments, controller 502 performs an autoconfiguration scan to detect the communications protocols for each of the ports and interfaces 504-508. Controller 502 can include an autoconfiguration manager configured to manage the autoconfiguration scan. In some embodiments, controller 502 creates a separate instance of the autoconfiguration manager for each of the ports and interfaces 504-508 for which a communications protocol is to be detected.

The autoconfiguration manager van use a plurality of autoconfiguration objects (ACOS) stored within controller 502 to perform the autoconfiguration scan. Each ACO can be configured to test for a particular protocol. The autoconfiguration manager can iteratively select each of the ACOs and allow the selected ACO to test the corresponding port or interface to determine whether the tested protocol is the correct protocol for that port or interface. If an ACO detects that a particular protocol is correct, the ACO can report a successful detection to the autoconfiguration manager. The autoconfiguration manager can terminate the autoconfiguration scan in response to a successful protocol detection.

Once a communications protocol has been detected for a particular port or interface, controller 502 can identify the equipment or device connected to that port or interface. Controller 502 can use the ACO that successfully identified the correct protocol to perform the equipment identification. Different ACOs can use different identification techniques to perform the equipment identification. For example, some of the ACOs can send a request for the device ID to equipment 540. If the protocol used by the ACO is correct, equipment 540 may reply with a message that includes the device ID, name, model, and/or other identifying attributes. Other ACOs can scan all of the available attributes of messages received from equipment 540. Controller 502 can compare the attributes to various sets of equipment attribute mappings from an attribute mapping database. If a match is found, controller 502 can determine that the equipment 540 is the same as the equipment defined and identified by the attribute mappings.

Unlike conventional techniques, controller 502 does not need to classify the connected equipment 540 (or any other device connected to ports 504-508) as self-describing or non-self-describing. Such a classification is not necessary to accomplish the autoconfiguration scan. Rather than classifying a connected device as self-describing or non-self-describing, controller 502 uses individual ACOs to perform protocol-specific autoconfiguration processes that vary based on the configuration of each ACO, not the configuration of the connected device. Some ACOs can be configured to determine both the correct communications protocol for a particular port or interface and identity of the device connected to that port or interface. Other ACOs can be configured to determine only the correct communications protocol, but not the identity of the connected device.

Controller 502 can be configured to select an equipment model based on the identity of the connected equipment 540. For example, controller 502 can access an equipment model database and retrieve an equipment model corresponding to the model, name, and/or device ID of the connected equipment. Controller 502 can use the selected equipment model and the detected communications protocol to generate protocol-specific control signals for the connected equipment 540. Controller 502 can then provide the protocol-specific control signals to equipment 540 via equipment port 506. In some embodiments, controller 502 includes some or all of the features of the controller described in U.S. patent application Ser. No. 14/735,955 filed Jun. 10, 2015, the entire disclosure of which is incorporated by reference herein.

Still referring to FIG. 5, system 500 is shown to include a MAP gateway 510 and a smart grid interface 512. MAP gateway 510 can receive data from communications interface 508 and push data to the cloud (e.g., remote data storage, remote systems and applications 444, client devices 448, etc.). The data can be used to generate reports for the customer to show how much energy and money they are saving using their solar array or wind turbines. MAP gateway 510 can also communicate with utility providers, an energy grid, energy resellers, energy service organizations, and the like via smart grid interface 512. For example, MAP gateway 510 can model equipment 540 in IEC-61850 and interface with the energy grid. MAP gateway 510 can receive requests from the utility provider such as frequency regulation requests, power curtailment requests, incentive program notifications, etc. For example, when the grid voltage dips, reactive power requests could be sent from the utility and forwarded to power inverters 514 to help stabilize the grid voltage. When a utility request is not present, power meter 532 can detect poor power factor and command the system to help correct the problem.

Field Controller Configurations

Figure 6:
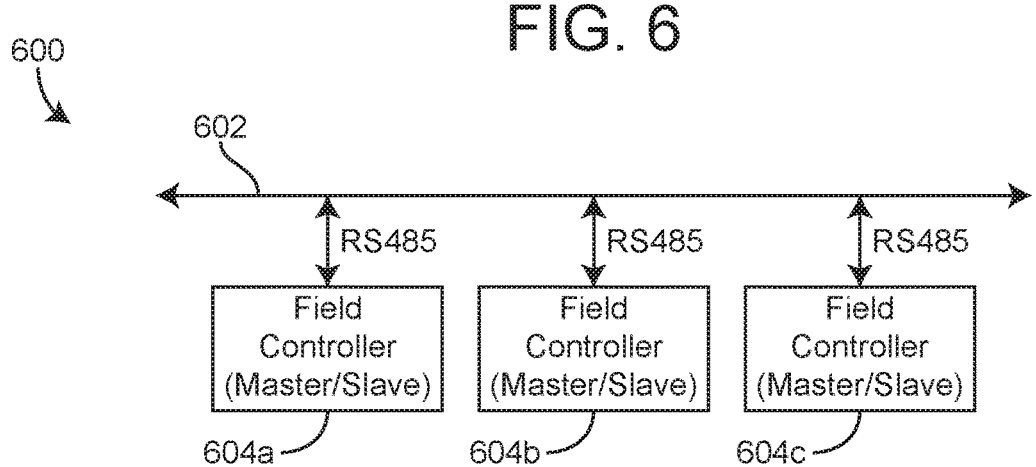
FIG. 6 is a block diagram of a master/slave configuration of field controllers, according to some embodiments.
Figure 7:
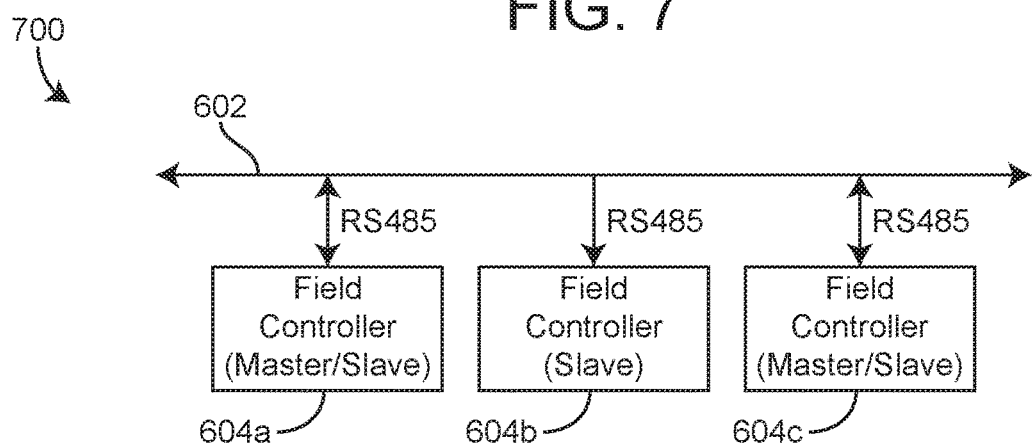
FIG. 7 is a block diagram of a master/slave configuration of field controllers with one of the field controllers configured to operate as a slave device, according to some embodiments.
Figure 8:
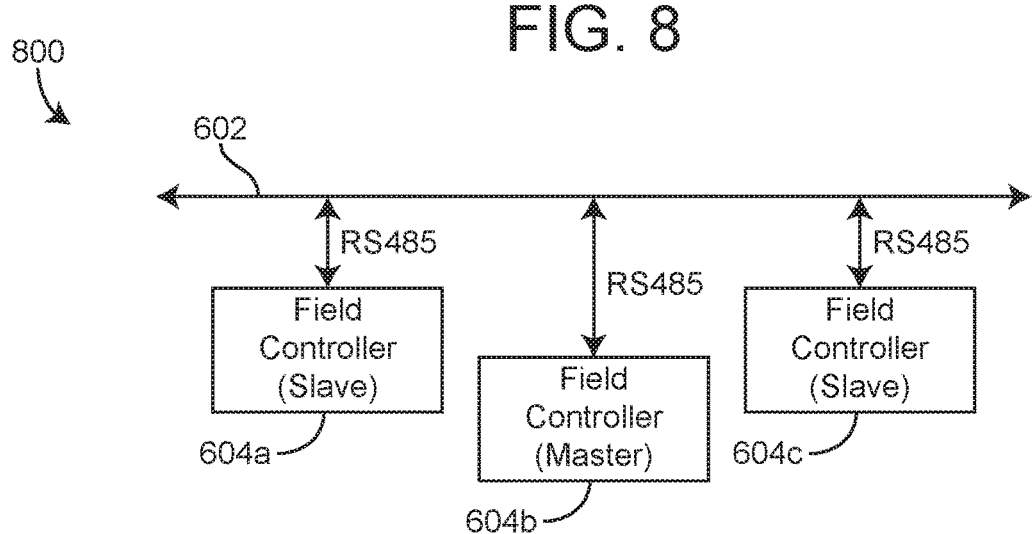
FIG. 8 is a block diagram of a master/slave configuration of field controllers with one of the field controllers configured to operate as a master device, according to some embodiments.

Referring now to FIGS. 6-8, various protocol configurations of controller systems 600-800 are shown, according to some embodiments. In some embodiments, any of field controllers 604 are configured to operate as slave devices, master devices or master/slave devices, according to some embodiments. FIG. 6 shows field controllers 604*a-c* configured to operate according to a master/slave protocol, according to some embodiments. In some embodiments, each of field controllers 604*a*-604*c* are configured to communicate according to a multi-drop serial bus. Each of field controllers 604*a-c* are shown wiredly and communicably connected to system bus 602 with an RS485 serial datalink. Various communications protocols may use the multi-drop serial bus, as shown in FIG. 6. In some embodiments, each of field controllers 604*a-c* are connected to the same wire (i.e., system bus 602). In some embodiments, each of field controllers 604*a-c* are configured to receive/listen to data from system bus 602, and may communicate with each other to send data or may wait for a request from a bus mastering device. In some embodiments, any of field controllers 604*a-c* are configured to stay in a slave/listening/receiving mode only for an entire duration of an auto-detection process.

Any of field controllers 604*a-c* may be configured to communicate with a device (not shown). For example, field controller 604*a* may be configured to receive information from a sensor (e.g., an air quality sensor, a temperature sensor, a humidity sensor, a motion detector, a smoke detector, etc.), and provide data to any of the other field controllers 604 and/or the bus mastering device. Any of field controllers 604*a-c* may be configured to communicate with a corresponding building device/equipment (e.g., a power inverter, fire safety equipment, lifts/escalators, electrical devices, security devices, HVAC equipment, lighting devices, energy storage, an AHU, an economizer, a chiller, etc.). In some embodiments, any of BAS controller 366, AHU controller 330, or any other controller is configured to be the bus mastering device.

In some embodiments, any of field controller 604*a-c* may be connected and/or disconnected to system bus 602. When any of field controller 604*a-c* is connected to system bus 602, it must be configured to communicate according to the same communications protocol as other field controllers 604*a-c* and/or system bus 602, according to some embodiments. For example, field controller 604*a* may be disconnected (e.g., for maintenance, to reconfigure settings, etc.), and reconnected. When field controller 604*a* is reconnected, the communications protocol settings may be either set manually (e.g., set to a specific master communications protocol, a specific slave communications protocol, a specific master/slave communications protocol, etc.) or detected automatically. Field controller 604*a* may be configured to perform the auto-detection process to determine a communications protocol and datalink parameters to communicate with system bus 602, and may reconfigure to communicate according to the appropriate communications protocol settings. Likewise, any of field controllers 604*a-c* may be configured to perform the auto-detection process to determine appropriate communications protocol settings. In some embodiments, the bus mastering device is configured to perform the auto-detection process. The auto-detection process is described in greater detail below with reference to FIGS. 10-15*b*, according to some embodiments. In some embodiments, any of field controllers 604*a-c* or bus mastering device is configured to perform the auto-detection process upon start up. While FIGS. 6-9 show only three field controllers 604, any number of field controllers 604 or any other controllers may be used (e.g., greater than three, less than three, etc.).

Referring now to FIG. 7, field controller 604*b* is shown configured as a slave device connected to system bus 602, according to some embodiments. In some embodiments, when field controller 604*b* is configured as a slave device, field controller 604*b* is configured to only receive/listen for data from system bus 602. In some embodiments, field controller 604*b* is configured to default to operate as a slave device when field controller 604*b* is first connected to system bus 602. In some embodiments, field controller 604*b* is configured to default to operate as a slave device when it is performing at least some of the auto-detection process (e.g., slave protocol detection process). Any of field controllers 604*a-c* may be configured to default to operate as a slave device when initially connected to system bus 602. In some embodiments, when field controller 604*b* is configured to operate as a slave device, field controller 604*b* can only respond to a request (e.g., a protocol request) received from a master device connected to system bus 602.

Referring now to FIG. 8, field controller 604*b* is shown configured as a master device connected to system bus 602, according to some embodiments. In some embodiments, field controller 604*b* is transitioned from operating in the slave device mode to operating in the master device mode after some of the auto-detection process has been completed (e.g., slave protocol detection process has been completed). In some embodiments, field controller 604b reconfigures into the master device mode to complete some of the auto-detection process (e.g., master protocol auto detection). In some embodiments, any of the other field controllers 604 (i.e., field controller 604a and field controller 604c) are configured to operate in a slave device mode. In some embodiments, field controller 604b transitions into the master device mode in response to completing part of the auto-detection process (e.g., the slave protocol detection process) and determining that system bus 602 is not operating according to a slave communications protocol (e.g., in response to determining that a bus mastering device is not connected to system bus 602). In this way, if field controller 604b determines that a bus mastering device is not connected to system bus 602, field controller 604b takes on the role of the bus mastering device.

Figure 9:
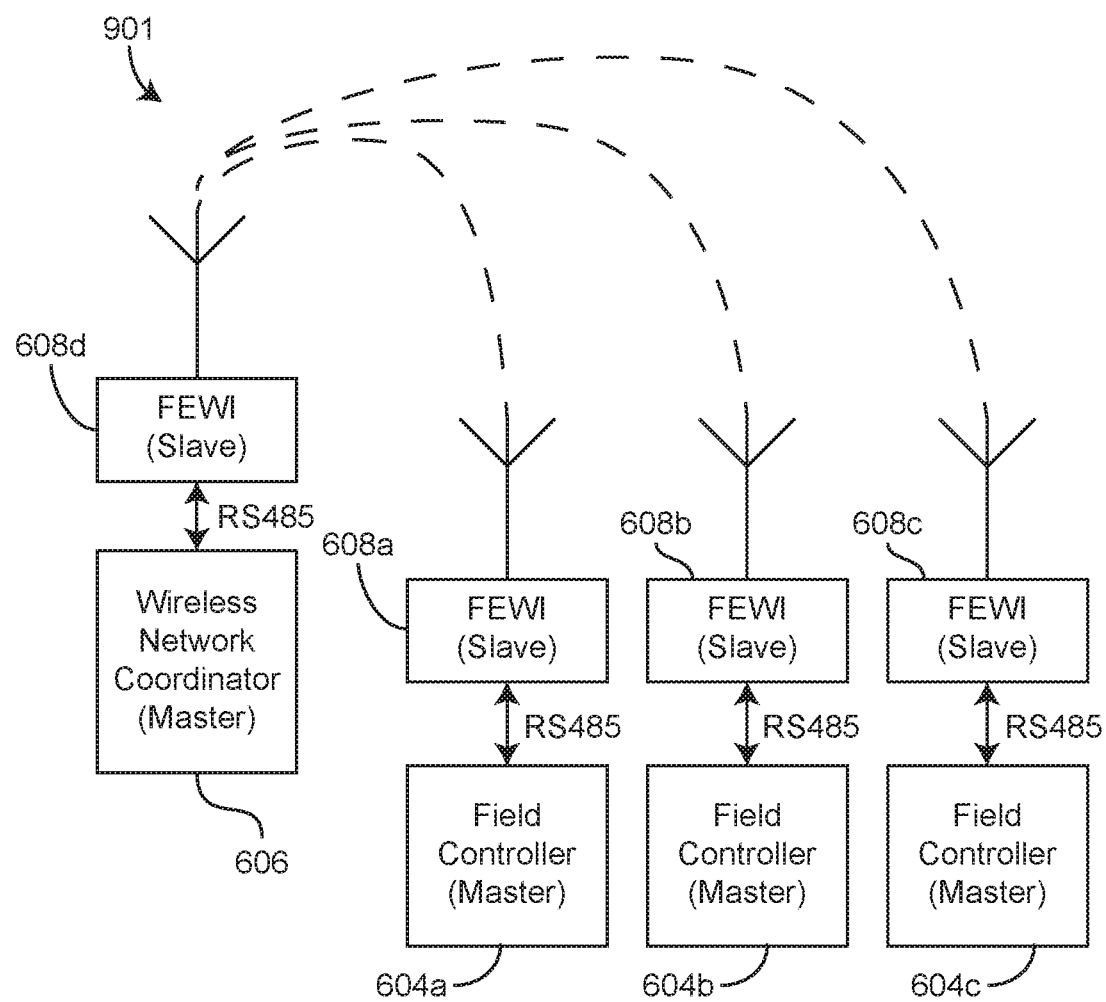
FIG. 9 is a block diagram of a wireless master/slave configuration of field controllers, according to some embodiments.

Referring now to FIG. 9, a wireless communications field controller network 901 is shown, according to some embodiments. Each of field controllers 604a-c are shown communicably connected to a field equipment wireless interface (FEWI) 608, according to some embodiments. For example, field controller 604a is communicably connected to FEWI 608a, field controller 604b is communicably connected to FEWI 608b, and field controller 604c is communicably connected to FEWI 608c, according to some embodiments. In some embodiments, field controllers 604 are communicably connected to FEWI 608 with a RS485 wired connection. In an exemplary embodiment, FEWI 608 are configured to communicate via ZigBee. In some embodiments, FEWI 608 are configured to communicate with any of Wi-Fi, LoRa, Bluetooth, etc., or any other wireless communications protocol. In some embodiments, FEWI 608 are separate processors including a wireless radio and are configured to operate according to any of the wireless communications protocols described herein (e.g., ZigBee, Wi-Fi, LoRa, Bluetooth, etc.). In some embodiments, if FEWI 608 are separate devices, field controllers 604 are configured to connect to FEWI 608 through a same communications port as used to wiredly connect field controllers 604 to system bus 602 (e.g., RS485). In some embodiments, field controllers 604 and FEWI 608 are each one device (e.g., FEWI 608a is a component of field controller 604a, FEWI 608b is a component of field controller 604b, FEWI 608c is a component of field controller 604c, etc.). In this way, FEWI 608 replace the wired connection between any of field controllers 604 and system bus 602, according to some embodiments.

In some embodiments, FEWI 608 are configured to directly wirelessly communicate with a singular FEWI 608 (e.g., FEWI 608d). In some embodiments, FEWI 608 are configured to communicably connect with each other to form a wireless communications mesh network.

Referring still to FIG. 9, each of field controllers 604 is configured to operate as a master device relative to the corresponding FEWI 608. For example, field controller 604a is a master device of FEWI 608a. Likewise, FEWI 608a is a slave device of field controller 604a. Since a wirelessly communicable device (e.g., FEWI 608) operates in response to a controller (e.g., controller 604a) determining communications between FEWI 608 and another FEWI 608, wireless communications cannot require any of field controllers 604 to operate according to a slave device mode. In this way, if any of field controllers 604 determine that the communications protocol of wireless communications field controller network 901 (or any of controller systems 600-800) is a slave communications protocol, it can be determined that the communications protocol of network 901 (and/or any of controller systems 600-800) is not a wireless communications protocol. For example, if field controller 604a is configured to operate as a slave device, field controllers 604a will not receive information from FEWI 608a.

Referring still to FIG. 9, wireless communications field controller network 901 is shown to include a wireless network coordinator 606, according to some embodiments. In some embodiments, wireless communications field controller network 901 is configured to operate according to a request/response serial protocol and wireless network coordinator 606 is configured to operate as a protocol master.

Field Controller

Figure 10:
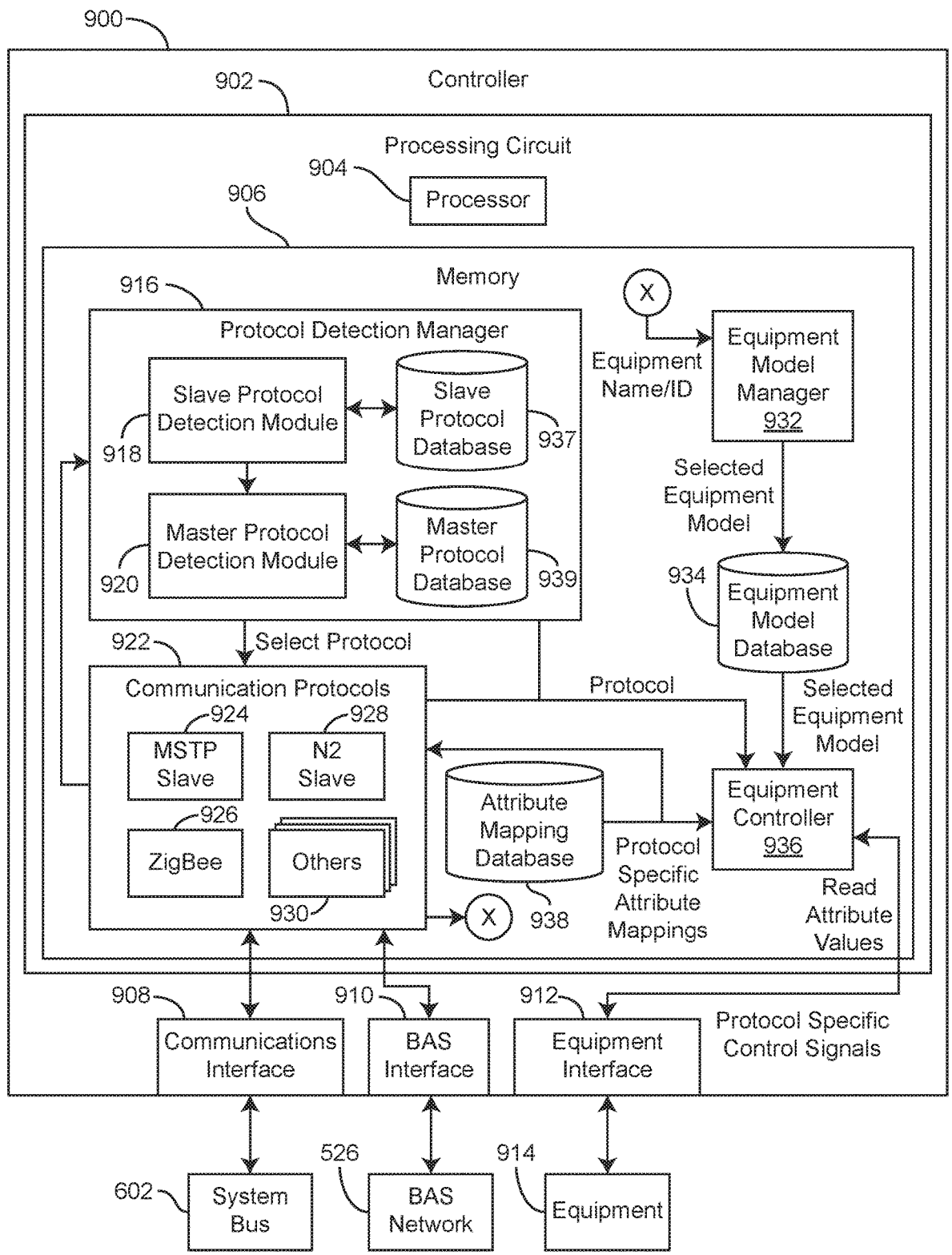
FIG. 10 is a block diagram of a controller configured to perform an auto-detection process, according to some embodiments.

Referring now to FIG. 10, a controller 900 is shown, according to some embodiments. In some embodiments, controller 900 is any of field controllers 604. In some embodiments, controller 900 or any modules, functionality, etc., is included in any of field controllers 604, BAS controller 366, AHU controller 330, etc., or any other controller connected to a system bus or an equivalent wireless network (see FIG. 9). In some embodiments, controller 900 is smart communications controller 502. Controller 900 is shown to include BAS interface 910, equipment interface 912, and communications interface 908. BAS interface 910 can be connected to BAS network 526 via BAS communications link 530. Equipment interface 912 can be connected to equipment (e.g., equipment 540) via equipment communications link 528. Communications interface 908 can be connected to communications network 446 and/or other external systems or devices (e.g., connected services) via an external communications link 534. In some embodiments, communications interface 908 communicably connects to system bus 602. In some embodiments, communications interface 908 communicably connects to FEWI 608. In some embodiments, communications interface 908 is an RS-485 connection. In some embodiments, any of communications interface 908, BAS interface 910, and equipment interface 912 are configured to connect to FEWI 608 and/or system bus 602. In some embodiments, communications interface 908, BAS interface 910, and equipment interface 912 are RS-485 connection interfaces. Although only three physical ports are shown in FIG. 10, it should be understood that controller 900 can include any number of physical ports. Each port can connect to different equipment or systems, which can be configured to communicate using different native communications protocols.

Controller 900 is shown to include a processing circuit 902 having a processor 904 and memory 906. Processor 904 can be a general purpose or specific purpose processor, an application specific integrated circuit (ASIC), one or more field programmable gate arrays (FPGAs), a group of processing components, or other suitable processing components. Processor 904 is configured to execute computer code or instructions stored in memory 906 or received from other computer readable media (e.g., CDROM, network storage, a remote server, etc.).

Memory 906 can include one or more devices (e.g., memory units, memory devices, storage devices, etc.) for storing data and/or computer code for completing and/or facilitating the various processes described in the present disclosure. Memory 906 can include random access memory (RAM), read-only memory (ROM), hard drive storage, temporary storage, non-volatile memory, flash memory, optical memory, or any other suitable memory for storing software objects and/or computer instructions. Memory 906 can include database components, object code components, script components, or any other type of information structure for supporting the various activities and information structures described in the present disclosure. Memory 906 can be communicably connected to processor 904 via processing circuit 902 and can include computer code for executing (e.g., by processor 904) one or more processes described herein. When processor 904 executes instructions stored in memory 906, processor 904 generally configures controller 900 (and more particularly processing circuit 902) to complete such activities.

Still referring to FIG. 10, controller 900 is shown to include a communications protocol manager 922. Communications protocol manager 922 includes various communications protocols (which may be protocol-specific objects) configured to cause controller 900 to communicate via a specific protocol. Communications protocol manager 922 is shown to include a MSTP protocol 924, an N2 protocol 928, a ZigBee protocol 926, and other protocols 930, according to some embodiments. In some embodiments, communications protocol manager 922 includes any of a Modbus protocol, a DNP3 protocol, an IEC-60870-5 protocol, an IEC-61850 protocol, a KNX protocol, an Ethernet protocol, a BACnet IP protocol, a Modbus IP protocol, a LoRa protocol, a Wi-Fi protocol, etc. Each of the protocols of communication protocol manager 922 corresponds to a specific communications protocol (e.g., MSTP, N2, etc.) and configures controller 900 to communicate via the specific communications protocol. In some embodiments, communication protocol manager 922 configures controller 900 to communicate with a baud rate and a mode corresponding to the specific communications protocol. In some embodiments, any of the protocols used by controller 900 (or protocols which controller 900 can be configured to communicate according to) support field control bus operation on RS485 serial link via a multi-drop serial network.

Various properties of several communications protocol are shown in Table 1 below, according to some embodiments. Table 1 illustrates controller mode and datalink parameters for each of MSTP protocol 924, ZigBee protocol 926, and N2 protocol 928, according to some embodiments. The baud rate is shown as the only datalink parameter, however, the datalink parameters may include any other serial datalink parameters, including but not limited to, a number of data bits, start/stop bits, parity, etc., according to some embodiments.

TABLE 1

| Protocol | Controller Mode | Datalink Parameters | Notes |
| --- | --- | --- | --- |
| MS/TP | Slave | Baud rates: 9600, 19200, 38400, 57600, 76800 | Master Slave/Token Passing - BACnet datalink-level token ring protocol. |
| ZigBee | Master | Baud rate: 38400 | Master/Slave JCI proprietary protocol. Interfaces to ZigBee radio co-processor via RS485 multi-drop network. |
| N2 | Slave | Baud rate: 9600 | Single Master/Multiple Slave serial communication protocol. |

Although several specific examples of communications protocols are shown in FIG. 10, it should be understood that these communications protocols are merely non-limiting examples. It is contemplated that additional, fewer, and/or different communications protocols can be used in various embodiments. In some embodiments, controller 900 is configured to receive additional communications protocols from an external data source (e.g., via a software or firmware update) and can update communications protocol manager 922 accordingly. In some embodiments, communications protocol manager 922 can be combined with protocol detection manager 916. For example, the functionality provided by communications protocol manager 922 can be incorporated into protocol detection manager 916.

In some embodiments, communications protocol manager 922 include datalink objects. Datalink objects can be configured to manage the normal operation of a datalink protocol through a communication port (e.g., communications interface 908, BAS interface 910, etc.). Datalink objects can include any other communication task(s) used by communications protocol manager 922 to implement the datalink protocol that the datalink object is designed to support. Advantageously, communications protocol manager 922 can include both datalink objects and the additional functionality to perform automatic configuration processes (e.g., protocol detection, device identification, etc.). Communications protocol manager 922 may also be configured to interface with protocol detection manager 916.

In some embodiments, communications protocol manager 922 maintains a list of communications protocols that can be used for automatic protocol detection. This list of communications protocols is referred to as the "communications protocol scan list." The communications protocol scan list can be received from an external data source or generated by protocol detection manager 916 based on the communications protocols stored in memory 906. In some embodiments, protocol detection manager 916 modifies a communications protocol scan list received from an external data source by removing entries that do not correspond to one of the communications protocols stored in memory 906. In some embodiments, the communication protocols included in communications protocol manager 922 are divided into two groups, with the first group including communication protocols which require controller 900 to be configured in a slave mode and the second group including communication protocols which require controller 900 to be configured in a master mode. In some embodiments, any communication protocols which require controller 900 to be configured in the slave mode are put in the communications protocol scan list before the communication protocols which require controller 900 to be configured in the master mode. In some embodiments, the communications protocol scan list is an order of execution used by the auto-detection process. In some embodiments, the order of the communications protocol scan list is optimized in order to improve an efficiency or decrease a time it takes controller 900 to perform the auto-detection process. In some embodiments, the order of the communications protocol scan list is manually determined. In some embodiments, the order of the communications protocol scan list is optimized by the auto-detection process (e.g., by putting previously used communications protocols and datalink parameters first in the communications protocol scan list).

In some embodiments, each instance of protocol detection manager 916 maintains a separate communications protocol scan list. The communications protocol scan list for a particular instance of protocol detection manager 916 can define a set or subset of communications protocols (e.g., some or all of communications protocols) that the instance of protocol detection manager 916 will use to test the corresponding port or interface of controller 900 (e.g., communications interface 908, BAS interface 910, etc.). In some embodiments, the communications protocol scan list for an instance of protocol detection manager 916 includes configuration settings for each communications protocol that the corresponding port or interface can or will support. For example, the communications protocol scan list for the instance of protocol detection manager 916 that corresponds to communications interface 908 can include an MSTP communications protocol (e.g., wired or wireless), a Modbus communications protocol, a ZigBee communications protocol, an N2 communications protocol, or any other communications protocol that can be used to communicate using with system bus 602.

The communications protocol scan list for the instance of protocol detection manager 916 that corresponds to communications interface 908 can include MSTP slave protocol, N2 slave protocol, ZigBee protocol, or any other communications protocol that can be used to communicate with system bus 602 through communications interface 908.

In general, the communications protocol scan list for a specified port or interface (e.g., port X) can include communications protocol (e.g., protocol_1, protocol_2, protocol_3, . . . , protocol_N) that can be automatically detected for the specified port or interface. The list of supported communications protocols can be configurable and/or extendable for each instance of protocol detection manager 916. Each instance of protocol detection manager 916 can allow each of the communications protocols in its communications protocol scan list to run sequentially (e.g., in a round robin fashion) until the correct communications protocol for the corresponding port or interface is successfully identified.

In some embodiments, controller 900 is configured to include any of the functionality and/or modules (e.g., autoconfiguration objects) configured to perform protocol-specific autoconfiguration scan, as described in greater detail in U.S. patent application Ser. No. 15/444,034, filed on Feb. 27, 2017 the entire disclosure of which is incorporated by reference herein. Additionally, controller 900 is configured to include any of the functionality and/or modules (e.g., auto-configuration objects) configured to perform protocol-specific autoconfiguration scan, as described in greater detail in U.S. patent application Ser. No. 14/735,955, filed on Jun. 10, 2015, now U.S. Pat. No. 9,960,962, the entire disclosure of which is incorporated by reference herein.

The communications protocol scan list can include one or more of the following parameters for each communications protocol: protocol identifier, protocol class, item name, wait timeout, delete delay, initialization table pointer, persistence size, object create type, OID, BACnet class, BACnet OID, datalink parameters (e.g., baud rate, parity, etc.), master/slave detection mode, detection time, data threshold, error threshold, etc. Any of these parameters may be provided to protocol detection manager 916 for use in the auto-detection process. Any of the parameters can be an enumerated data value that identify the communications protocol used by system bus 602. The datalink parameters can configure communications interface 908 to communicate according to a specific baud rate, parity, etc., or can configure protocol detection manager 916 to identify a datalink parameter of system bus 602 (e.g., baud rate, parity, etc.). The master/slave detection mode can configure communications interface 908 to communicate with system bus 602 according to either a master or a slave mode. The detection time can configure controller 900 to communicate with (e.g., receive data from, wait for data reception, etc.) system bus 602 for a period of time before switching to another protocol. In some embodiments, the detection time is selected randomly for controller 900 (and any other controller with the same functionality as controller 900 such as any of field controllers 604*a*-*c*). The detection time is selected randomly to avoid the case when all controllers connected to system bus 602 start sending data at the same time. The data threshold is the number (e.g., quantity, samples, time, etc.) of data required to be received before protocol detection manager 916 determines a positive detection of a communications protocol of system bus 602, according to some embodiments. The error threshold is the number of errors which protocol detection manager 916 may register before determining that protocol detection has failed, according to some embodiments.

The wait timeout parameter can define an amount of time to wait for protocol detection manager 916 to determine if the corresponding protocol is correct for the tested port or interface. In some embodiments, the wait timeout parameter has a maximum value (e.g., 6 minutes or 360 seconds) that defines an upper threshold for permissible wait timeout values. If a wait timeout value greater than the maximum value is specified, protocol detection manager 916 can use the maximum timeout value instead of the specified value. The delete delay parameter can define an amount of time (e.g., 2-10 seconds) that protocol detection manager 916 waits after deleting the communications protocol before proceeding with a new communications protocol scan.

The object create type parameter may specify the type of object created by protocol detection manager 916 when the communications protocol is selected or loaded. In some embodiments, the object create type parameter can specify that the communications protocol should be created using a simple create process or with a BACnet OID. The simple create process can be specified if the communications protocol is not representing a BACnet protocol and does not have integrated datalink object functionality. However, if the communications protocol includes datalink functionality and/or represents a BACnet protocol, a more complex BACnet OID creation process can be specified. The simple create process may create the communications protocol without making the communications protocol a child of protocol detection manager 916. If and when the protocol detection manager 916 reports a successful protocol detection, the communications protocol may then be set as a child of protocol detection manager 916 and/or communications protocol manager 922. However, if the communications protocol is the only communications protocol in the scan list or if the communications protocol is otherwise certain to be locked in, the communications protocol can be created as a child of protocol detection manager 916 and/or communications protocol manager 922.

The OID, BACnet class, and BACnet OID parameters can be used in the BACnet OID creation process. These parameters may cause protocol detection manager 916 and/or communications protocol manager 922 to create an associated BACnet OID for the communications protocol. In some embodiments, protocol detection manager 916 may check the communication protocol's header to determine if it should be BACnet exposed. If so, a BACnet exposed flag can be set to true for the communications protocol.

Some of the communications protocols shown in communications protocol manager 922 may be defined as a slave communications protocol (e.g., MSTP protocol 924, N2 protocol 928, some of other protocols 930, etc.) and some may be defined as a master communications protocol (e.g., ZigBee protocol 926, some of other protocols 930, etc.). In some embodiments, protocol detection manager 916 is configured to select a communications protocol from communications protocol manager 922 and cause controller 900 to communicate with system bus 602 via communications interface 908 according to the selected communications protocol. In some embodiments, protocol detection manager 916 is configured to select one or more predefined datalink parameters. For example, protocol detection manager 916 may select a baud rate from a set of possible baud rates for a certain communications protocol.

Referring still to FIG. 10, protocol detection manager 916 is shown to include slave protocol detection module 918 and master protocol detection module 920, according to some embodiments. In some embodiments, slave protocol detection module 918 is configured to perform the slave protocol detection process for any of the slave communications protocols of communications protocol manager 922. In some embodiments, master protocol detection module 920 is configured to perform the master protocol detection process for any of the master communications protocols of communications protocol manager 922.

Slave protocol detection module 918 and master protocol detection module 920 are shown communicably connected to a database, according to some embodiments. Slave protocol detection module 918 is shown communicating with slave protocol database 937 and master protocol detection module 920 is shown communicating with master protocol database 939, according to some embodiments. In some embodiments, when protocol detection manager 916 identifies the communications protocol of system bus 602, protocol detection manager 916 stores the parameters of the communications protocol of system bus 602 in either of slave protocol database 937 and master protocol database 939.

Communications protocol manager 922 is configured to cause communications interface 908 to communicate with system bus 602 via various communications protocol, according to some embodiments. In some embodiments, the information/data received from system bus 602 is provided to protocol detection manager 916 for the auto-detection process. In some embodiments, the communications protocol which communications protocol manager 922 causes communications interface 908 to communicate with system bus 602 with is selected by protocol detection manager 916 as a part (e.g., a step) of the auto-detection process.

Still referring to FIG. 10, controller 900 is shown to include an equipment model manager 932. Equipment model manager 932 may be configured to select an equipment model for equipment 914 based on the identity of equipment 914. Equipment model manager 932 is shown receiving the equipment name/ID from communications protocol manager 922. Equipment model manager 932 uses the equipment name/ID to identify and retrieve a corresponding equipment model from equipment model database 934.

Equipment model database 934 may include any number of equipment model (e.g., database) packages available to controller 900. In some embodiments, equipment model database 934 is a portion of the local memory of controller 900 (e.g., serial flash). Additional equipment model packages can be downloaded over a communications network (e.g., a LAN, the Internet) and/or provided by a removable storage device (e.g., a USB stick) to allow equipment model database 934 to be expanded to support additional equipment models or protocols.

In some embodiments, equipment model manager 932 generates an attribute table based on the content of equipment model database 934. The attribute table may indicate the number of equipment models available in equipment model database 934 and may include a list of the available equipment models. Equipment model manager 932 may be configured to scan equipment model database 934 upon startup and may populate the attribute table with information describing the equipment models stored in equipment model database 934.

Equipment model manager 932 may populate the attribute table with information identifying the building equipment to which each of the stored equipment models pertains. For example, one of the equipment models may be a model for a first type of chiller (or other type of building equipment) having a particular manufacturer, model number, or device ID, whereas another of the equipment models may be a model for a second type of chiller (or other type of building equipment) having a different manufacturer, model number, or device ID. Equipment model manager 932 may be configured to populate the attribute table with an attribute or property identifying a particular type of building equipment associated with each equipment model. When an equipment name/ID is received from communications protocol manager 922, equipment model manager 932 may use the attribute table to identify and select a corresponding equipment model. Equipment model manager 932 may select an equipment model and provide the selected equipment model to equipment controller 900.

Still referring to FIG. 10, controller 900 is shown to include an equipment controller 936. Equipment controller 936 may be configured to control equipment 914 using the selected equipment model. In various embodiments, equipment controller 936 may use closed loop control, open loop control, feedback control, feed-forward control, PI control, model predictive control, or any other type of automated building control methodology that relies on an equipment model to translate an input into an output. In some embodiments, the output is a control signal for equipment 914 (e.g., dampers, air handling units, chillers, boilers, fans, pumps, etc.) that operate to affect a variable state or condition (e.g., temperature, humidity, air flow rate, etc.) within a building space.

Equipment controller 936 may receive inputs from building equipment 510, sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other systems or devices via equipment interface 912, BAS interface 910, and/or communications interface 908. Equipment controller 936 may apply the various inputs to the selected equipment model to determine an output for equipment 914. Equipment controller 936 may operate equipment 914 maintain building conditions within a setpoint range, to optimize energy performance (e.g., to minimize energy consumption, to minimize energy cost, etc.), and/or to satisfy any constraint or combination of constraints as may be desirable for various implementations.

Still referring to FIG. 10, controller 900 is shown to include an attribute mapping database 938. Attribute mapping database 938 may act as a configuration data store for the various mappings used by controller 900 to support the protocols used by communications protocol manager 922 and equipment controller 936. For example, attribute mapping database 938 may store mappings that associate particular attributes used by communications protocol manager 922 and/or equipment controller 936 with particular attributes of protocol-specific messages exchanged between controller 900 and external systems or devices.

Communications protocol manager 922 is shown receiving protocol-specific attribute mappings from attribute mapping database 938. Communications protocol manager 922 may use the protocol-specific attribute mappings to properly interpret messages received from external systems or devices using a particular communications protocol. For example, communications protocol manager 922 may use the protocol-specific attribute mappings to identify and extract the equipment name/ID from response messages received from equipment 914. Communications protocol manager 922 may use the protocol-specific attribute mappings to generate messages that can be sent to external systems or devices using a particular communications protocol.

Equipment controller 936 is also shown receiving the protocol-specific attribute mappings from attribute mapping database 938. Equipment controller 936 may use the protocol-specific attribute mappings to identify a particular variable for which a value is specified in a message received from an external data source. For example, equipment controller 936 may read the attribute values of messages received from equipment 914. Equipment controller 936 may use the attribute mappings to associate the attribute values with a particular variable that is used in the selected equipment model. Equipment controller 936 may generate a control signal for equipment 914 and use the attribute mappings to convert the control signal into a protocol-specific control signal for equipment 914.

In some embodiments, attribute mapping database 938 includes attribute mappings for each of the communications protocols used by controller 900. For example, attribute mapping database 938 may include attribute mappings for any of MSTP protocol 924, N2 protocol 928, ZigBee protocol 926, and other proprotocol 930, according to some embodiments.

The supported equipment list attribute may specify the model name, model ID, or other identifier of equipment 914 or BAS network 526 to which the mapping information pertains. The MSTP Slave mapping information includes protocol-specific attributes of messages sent or received by a BAS network using the MSTP Slave protocol and the corresponding attributes used by controller 900. Similarly, the N2 Slave mapping information includes protocol-specific attributes of messages sent or received by a BAS network using the Modbus Slave protocol and the corresponding attributes used by smart communications controller 502. The Modbus Master mapping information includes protocol-specific attributes of messages sent or received by building equipment using the Modbus Master protocol and the corresponding attributes used by smart communications controller 502. Any of communications protocol manager 922, protocol detection manager 916, and equipment controller 936 may use the attribute mappings provided by attribute mapping database 938 to extract information from protocol-specific messages, generate messages that comply with a particular protocol, and/or translate messages between various communications protocols.

In some embodiments, communications protocol manager 922 and/or protocol detection manager 916 use the attribute mappings to identify the protocol used or received by a particular port or interface. For example, a message may be received at communications interface 908 in an unknown protocol. Communications protocol manager 922 and/or protocol detection manager 916 may scan all of the attributes of the message and compare the attributes to the various sets of attributes listed in attribute mapping database 938. If the attributes of the message match the attributes listed in attribute mapping database 938 for a particular protocol (e.g., N2 protocol 928), communications protocol manager 922 and/or protocol detection manager 916 may determine that the protocol corresponding to the matching attributes is correct for communications interface 908. The same or similar technique may be used to identify the communications protocol for BAS interface 910 and/or equipment interface 914.

Automatic Protocol Detection Process

Overview

Figure 11:
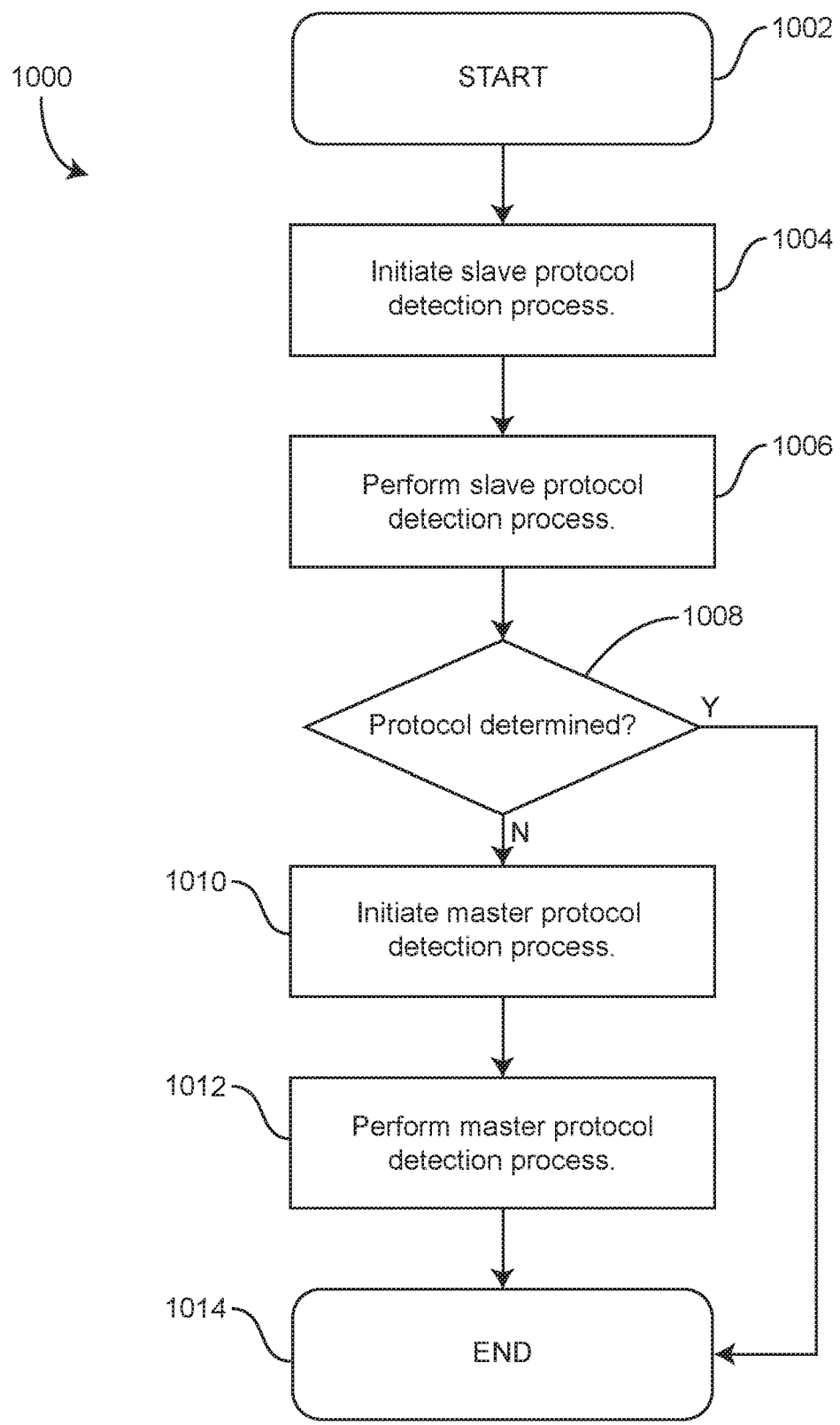
FIG. 11 is a flowchart of a process for automatically detecting a communications protocol, according to some embodiments.
Figure 12:
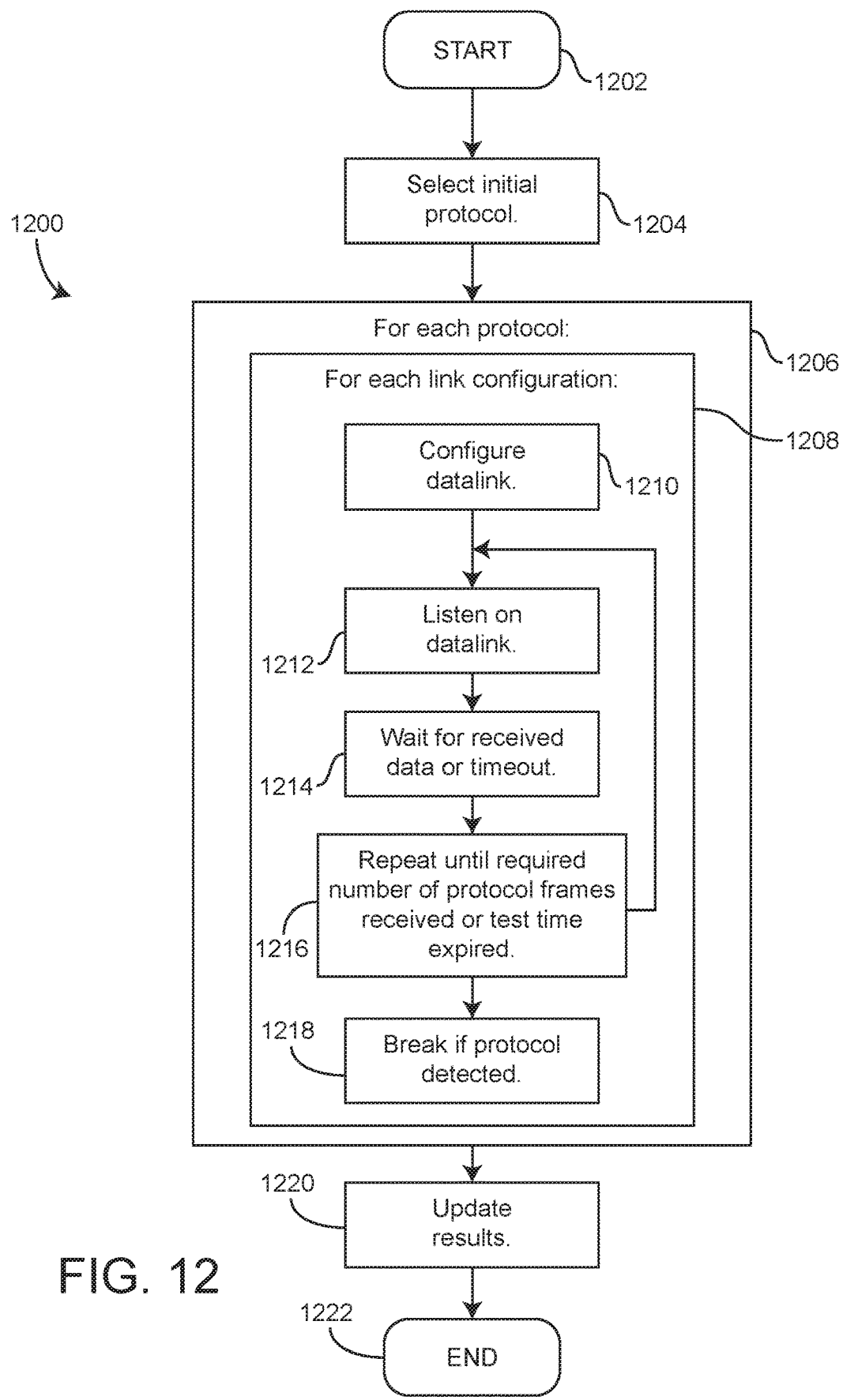
FIG. 12 is a flowchart of a slave protocol detection process for automatically detecting a slave communications protocol, according to some embodiments.
Figure 13A:
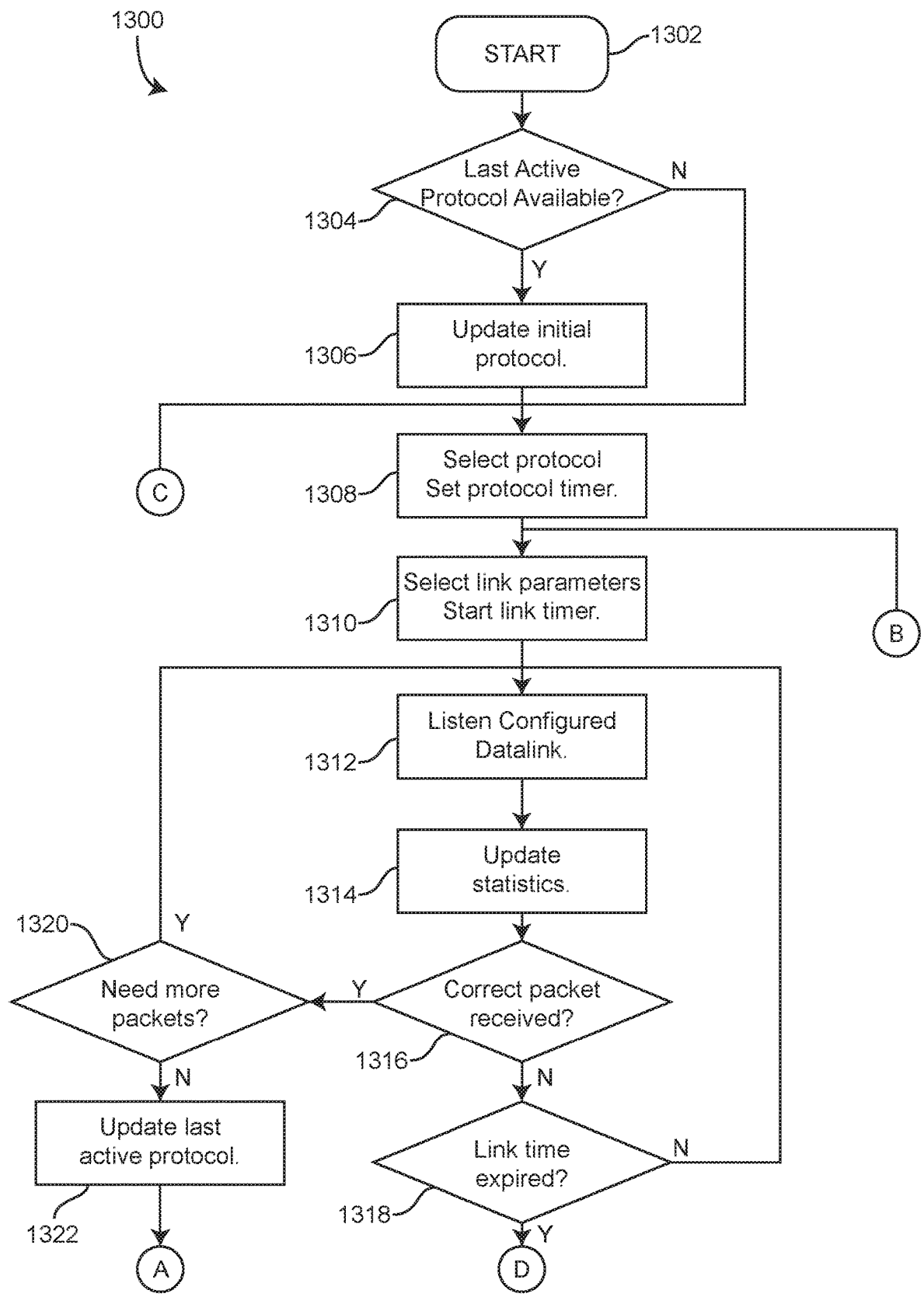
FIG. 13*a* is a flowchart of a slave protocol detection process for automatically detecting a slave communications protocol, according to some embodiments.
Figure 13B:
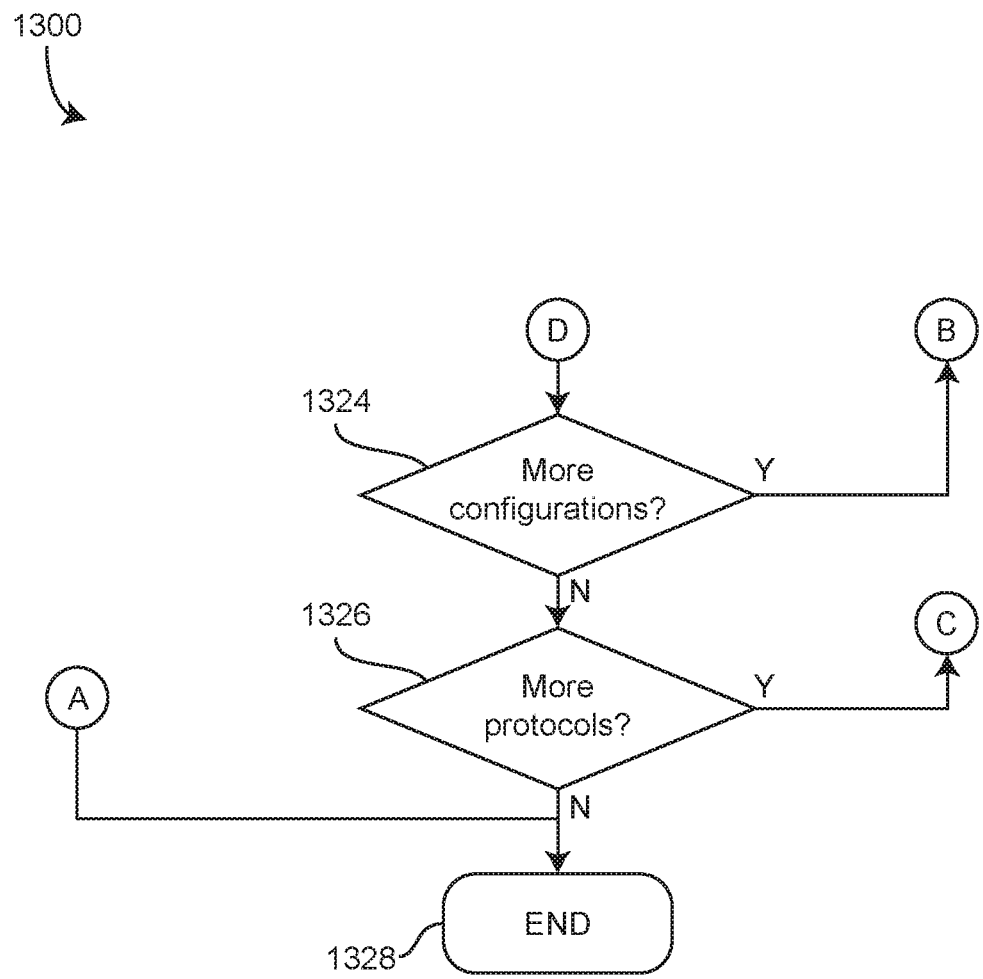
FIG. 13*b* is a flowchart of a slave protocol detection process for automatically detecting a slave communications protocol, according to some embodiments.
Figure 14:
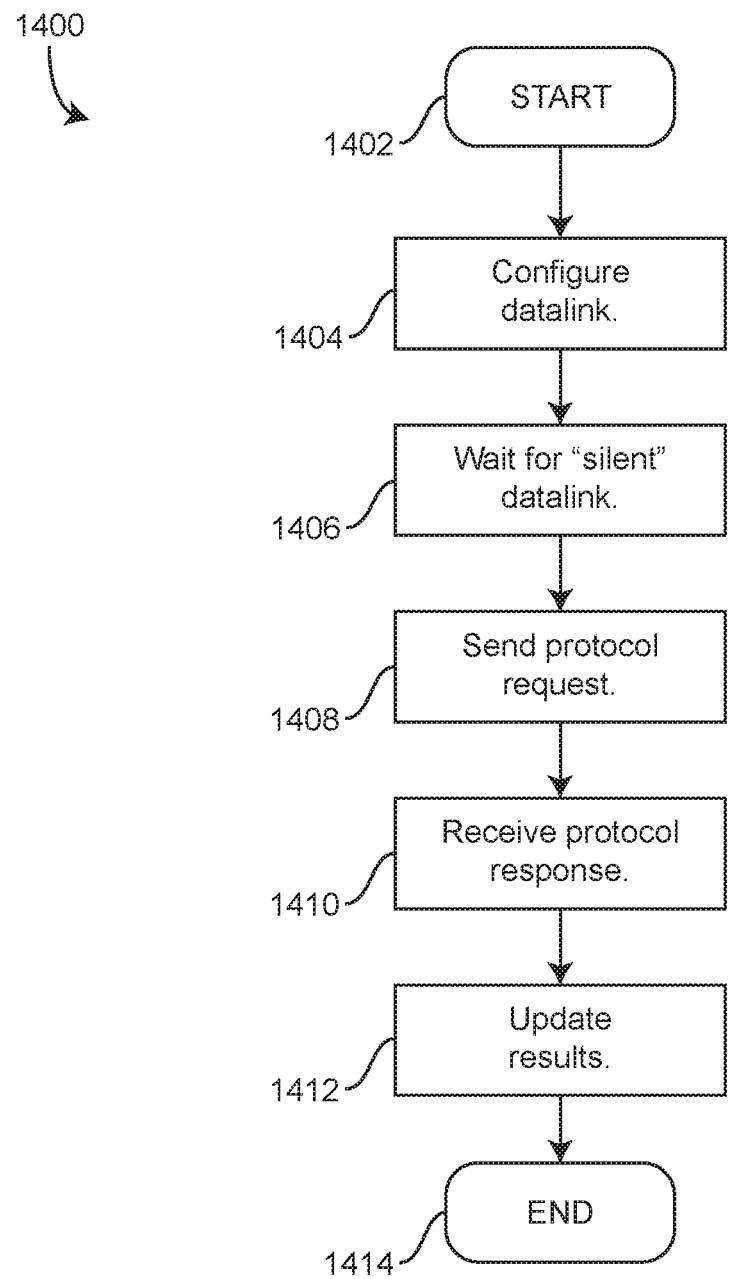
FIG. 14 is a flowchart of a master protocol detection process for automatically detecting a master communications protocol, according to some embodiments.
Figure 15A:
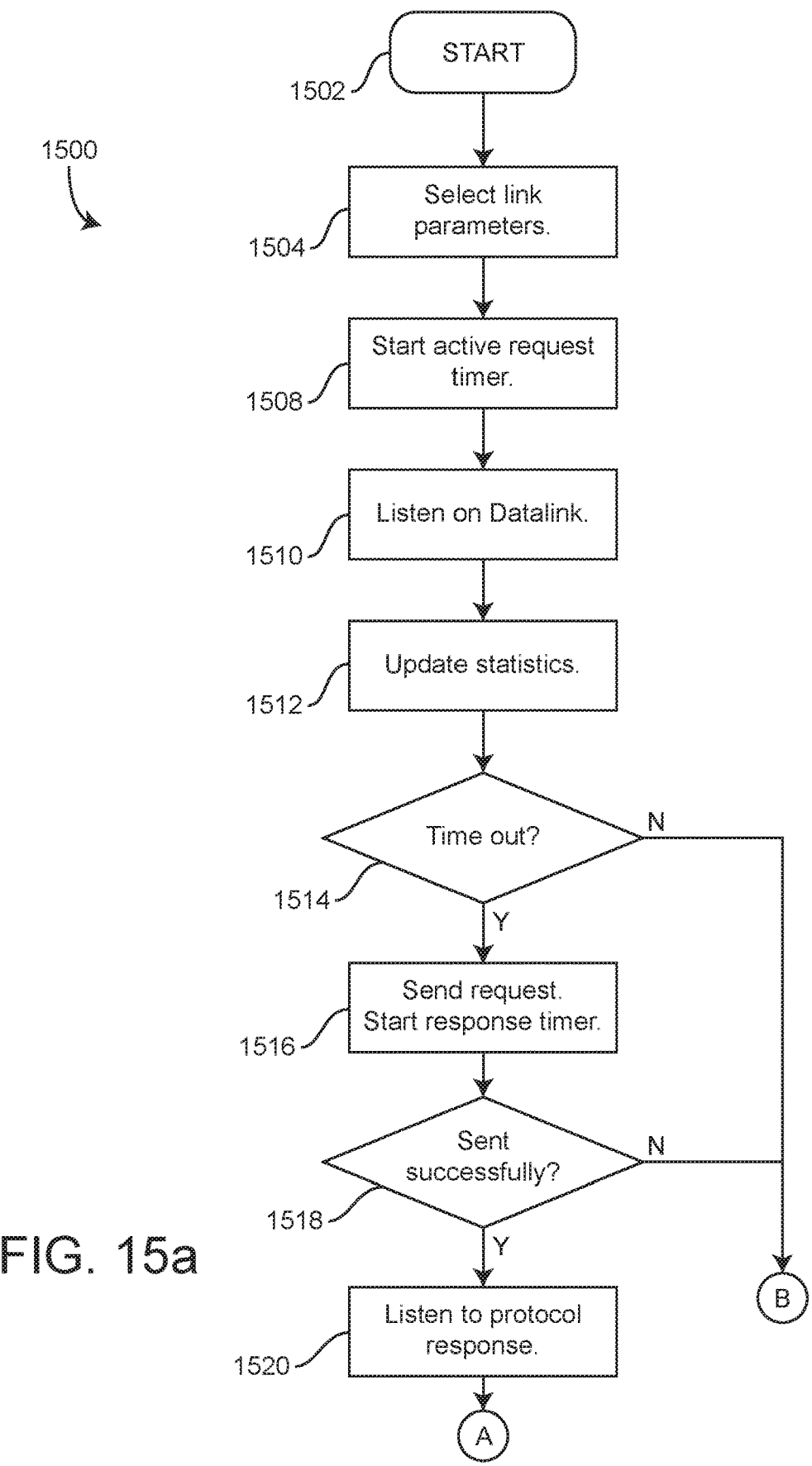
FIG. 15*a* is a flowchart of a master protocol detection process for automatically detecting a master communications protocol, according to some embodiments.
Figure 15B:
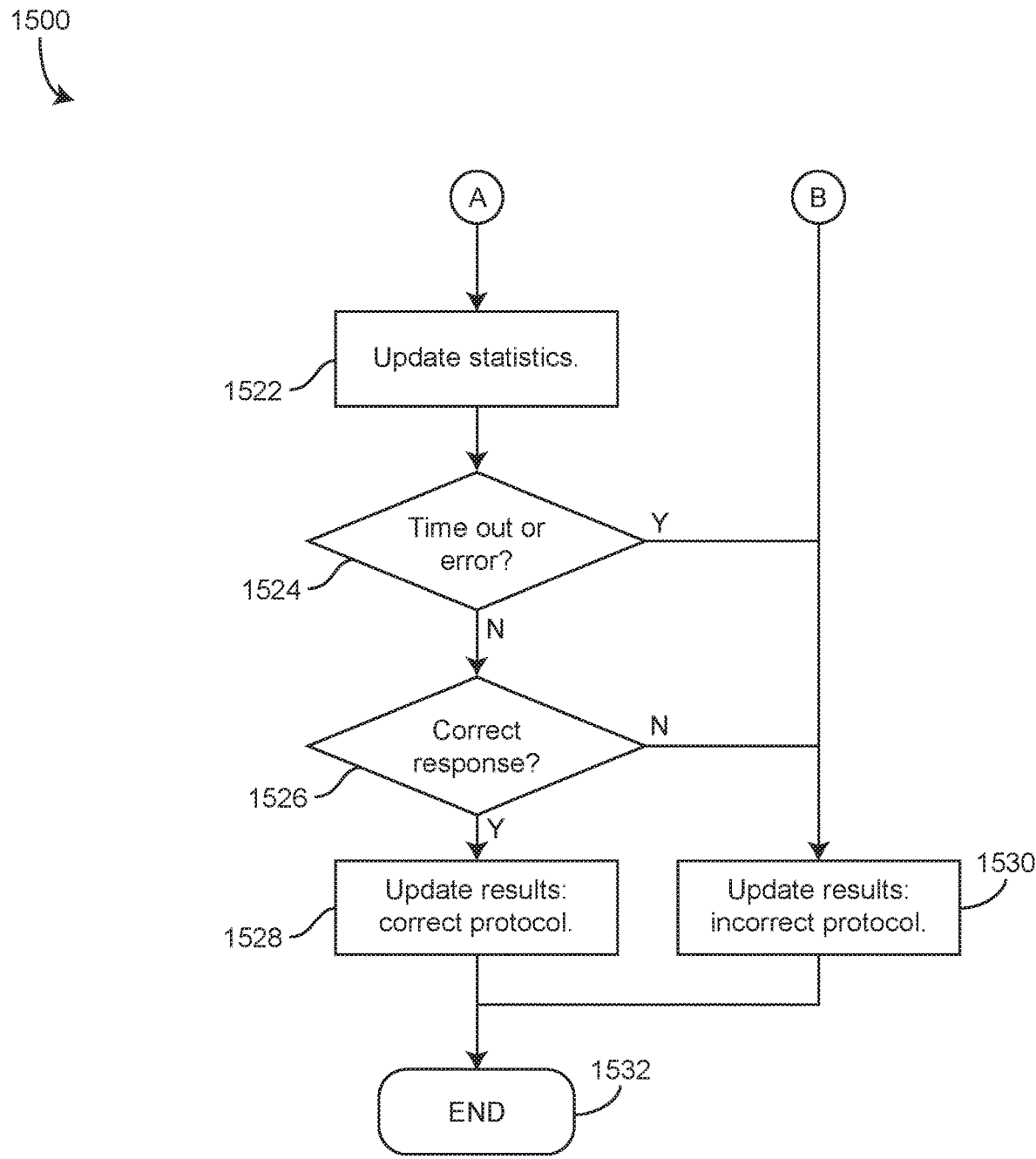
FIG. 15*b* is a flowchart of a master protocol detection process for automatically detecting a master communications protocol, according to some embodiments.

Referring now to FIGS. 11-15*b*, the auto-detection process is shown in greater detail, according to some embodiments. FIG. 11 shows a flowchart of the overall process of the auto-detection process, according to some embodiments. FIG. 12 shows a flowchart of the overall process of the slave protocol detection process of the auto-detection process, according to some embodiments. FIGS. 13*a-b* show a detailed flowchart of the slave protocol detection process, according to some embodiments. FIG. 14 shows a flowchart of the overall process of the master protocol detection process of the auto-detection process, according to some embodiments. FIGS. 15*a-b* show a detailed flowchart of the master protocol detection process, according to some embodiments.

Any of the processes shown in FIGS. 11-15*b* may be performed by controller 900 and/or any of field controllers 604, BAS controller 366, AHU controller 330, etc., or any other controller configured to serially communicate with system bus 602 (or any other serial bus). In some embodiments, some of the processes shown in FIGS. 11-15*b* are performed by slave protocol detection module 918 of protocol detection manager 916, while some of the processes are performed by master detection module 920 of protocol detection manager 916, according to some embodiments. In some embodiments, the auto-detection process is performed by the controller (e.g., controller 900) upon start up and/or upon being connected to a bus (e.g., system bus 602), according to some embodiments. Advantageously, the auto-detection process enables the controller to automatically detect a communications protocol used by the bus and reconfigure itself to communicate via the communications protocol without manual configuration. In some cases, the communications protocol used by the bus (e.g., system bus 602) depends on the types of connected equipment (e.g., types of equipment connected to field controllers 604), installation site configuration, network topology, initially selected communications protocol, reconfiguration, etc. In some cases, the communications protocol may change after installation due to a later network or BAS modification. The auto-detection process provides a more efficient way to configure controllers when they are brought online (e.g., connected to a bus such as system bus 602), and reduces configuration errors which may occur if the controller is manually configured.

Referring now to FIG. 11, auto-detection process 1000 is shown, according to some embodiments. Auto-detection process 1000 includes steps 1002-1014, according to some embodiments. In some embodiments, auto-detection process 1000 is initiated (step 1002) in response to the controller being brought online, connected to the bus, and/or turned on. In some embodiments, auto-detection process 1000 is periodically initiated to ensure that the controller is properly configured to communicate with the bus. In some embodiments, auto-detection process 1000 is initiated in response to the controller not receiving information for a predetermined amount of time from the bus. If the controller does not receive information from the bus for a predetermined amount of time, this may identify that the communications protocol of the bus has been changed (e.g., from a system update, a reconfiguration, a manual reconfiguration, etc.), according to some embodiments. In some embodiments, initiating auto-detection process 1000 includes reading all predefined protocols and reading datalink parameters, master/slave detection mode, detection time, data threshold, and error threshold for each of the predefined protocols. In some embodiments, initiating auto-detection process 1000 includes grouping the predefined communications protocols into either a master communications protocol or a slave communications protocol.

Auto-detection process 1000 includes initiating slave protocol detection process (step 1004), according to some embodiments. In some embodiments, the slave protocol detection process is initiated by any of protocol detection manager 916 and/or slave protocol detection module 918. Initiating the slave protocol detection process includes selecting a first slave communications protocol and configuring the controller (e.g., controller 900) to communicate with the bus (e.g., system bus 602) according to the selected slave communications protocol, according to some embodiments. In some embodiments, initiating the slave protocol detection process includes transitioning the controller (e.g., controller 900) into a slave mode of operation. In some embodiments, initiating the slave protocol detection process includes detecting slave protocols (e.g., MSTP, N2, etc.), and selecting the first communications protocol from the list of slave communications protocols. In some embodiments, initiating the slave protocol detection process includes configuring the controller to communicate with the bus with various datalink parameters (e.g., baud rate, parity, mode, detection time, data threshold, error threshold, etc.), according to the selected slave protocol detection process. In some embodiments, the slave communications protocols are stored in and selected from communications protocol manager 922. In some embodiments, communications protocol manager 922 configures the controller (e.g., controller 900) to communicate with the bus.

Referring still to FIG. 11, auto-detection process 1000 includes performing the slave protocol detection process (step 1006), according to some embodiments. In some embodiments, the slave protocol detection process is performed by slave protocol detection module 918. In some embodiments, the slave protocol detection process identifies which of the predefined slave communications protocols with which the bus is communicating. The slave protocol detection process is described in greater detail below with reference to FIGS. 12-13b, according to some embodiments. In some embodiments, if the slave protocol detection process does not determine the communications protocol which the bus is using (step 1008), auto-detection process 1000 proceeds to the master protocol detection process (steps 1010-1012). In some embodiments, if the slave protocol detection process does determine the communications protocol which the bus is using, the communications protocol parameters are stored (e.g., stored in slave protocol database 937), the controller is configured to communicate with the bus according to the determined communications protocol and auto-detection process 1000 is ended (step 1014).

If the slave protocol detection process does not determine the communications protocol which the bus is using, it is assumed that the bus is not using a slave communications protocol (or at least that it is not using any of the predefined slave communications protocols which the controller may be configured to communicate with) and the master protocol detection process is initiated (step 1010), according to some embodiments. In some embodiments the master protocol detection process is initiated similarly to the initiation of the slave protocol detection process (steps 1004 and 1010, respectively), but with respect to the predefined master communications protocols. In some embodiments, the master protocol detection process is initiated by protocol detection manager 916 and/or master protocol detection module 920. In some embodiments, initiating the master protocol detection process includes selecting a first predefined master communications protocol.

After the master protocol detection process has been initiated (step 1010), the master protocol detection process is performed (step 1012), according to some embodiments. In some embodiments, the master protocol detection process is performed by protocol detection manager 916 and/or master protocol detection module 920. In some embodiments, the master protocol detection process includes sending a request which should be recognized by any slave devices connected to the bus and configured to be slaves according to the first selected master communications protocol. The master protocol detection process is described in greater detail below with reference to FIGS. 14-15b, according to some embodiments.

After the master protocol detection process (step 1012) is performed, if the communications protocol is identified, the communications protocol parameters are stored (e.g., in master protocol database 939), the controller is configured to communicate with the bus according to the identified communications protocol, and auto-detection process 1000 is ended (step 1014), according to some embodiments. In some embodiments, if the communications protocol of the bus is not identified by the master protocol detection process, an error is stored (e.g., in master protocol database 939) and auto-detection process 1000 is ended (step 1014).

Slave Protocol Detection Process

Referring now to FIG. 12, process 1200 of slave protocol detection process is shown, according to some embodiments. In some embodiments, process 1200 illustrates an overview of the slave protocol detection process. In some embodiments, any or all of the steps of process 1200 are performed by slave protocol detection module 918.

Process 1200 is shown to include starting the slave protocol detection process (step 1202), according to some embodiments. In some embodiments, the slave protocol detection process is started/initiated in response to any of the controller being brought online, connected to the bus, and/or turned on. In some embodiments, the slave protocol detection process is started in response to a manual command to identify the communications protocol of the bus. In some embodiments, step 1202 of process 1200 is or includes any of steps 1002-1004 of auto-detection process 1000. In some embodiments, the slave protocol detection process is started in response to the slave protocol detection process being initiated/initially configured (step 1004 of auto-detection process 1000).

Process 1200 is shown to include selecting an initial slave protocol (step 1204), according to some embodiments. In some embodiments, the initial slave protocol is selected from the list of slave protocols stored in communications protocol manager 922. For example, the initial slave protocol may be the N2 protocol 928. In some embodiments, selecting the initial protocol also includes selecting the communications protocol parameters (e.g., datalink parameters, master/slave detection mode, detection time, data threshold, error threshold, etc.).

Process 1200 is shown to include various steps for each protocol (step 1206) and for each datalink configuration of each protocol (step 1208), according to some embodiments. As shown in Table 1 above, certain communications protocols may have various datalink parameters (e.g., different baud rates), according to some embodiments. In some embodiments, step 1206 is performed for each of the predefined slave communications protocols and step 1208 is performed for each of the various datalink parameters of each of the predefined slave communications protocols. For example, as shown in Table 1 above, MSTP has five different baud rates which the MSTP communications protocol may use. In some embodiments, step 1208 is performed for each of the five baud rates of the MSTP communications protocol.

Referring still to FIG. 12, process 1200 is shown to include configuring the datalink (step 1210), according to some embodiments. In some embodiments, the datalink is configured by communications protocol manager 922. In some embodiments, the datalink is configured by any of protocol detection manager 916 and/or slave protocol detection module 918. In some embodiments, configuring the datalink includes selecting a communications protocol and datalink parameters for the selected communications protocol and configuring the controller to communicate with the bus (e.g., configuring controller 900 to communicate with system bus 602), according to the first selected slave communications protocol (e.g., MSTP communications protocol). In some embodiments, configuring the datalink includes transitioning the controller into a slave mode of operation. Additionally, configuring the datalink includes setting the datalink parameters for the selected communication protocol, including but not limited to, baud rate, a number of data bits, start/stop bits, parity, etc., according to some embodiments. In some embodiments, the only datalink parameter which varies is the baud rate, and the other datalink parameters remain the same for all slave communications protocols. In some embodiments, configuring the datalink includes configuring various detection parameters. The detection parameters may include, but are not limited to, a number of retries, a number of communications errors, etc., according to some embodiments. These detection parameters may vary based on the communications protocol selected.

Process 1200 is shown to include listening to the information received on the datalink (step 1212), according to some embodiments. In some embodiments, any of communications protocol manager 922 and protocol detection manager 916 are configured to receive any information from system bus 602 through communications interface 908. Specifically, slave protocol detection module 918 may receive the information received from system bus 602 and analyze the information to determine if the selected protocol (and the selected datalink parameters for the selected protocol) are correct (e.g., match the communications protocol and datalink parameters of system bus 602), according to some embodiments.

In some embodiments, the controller (e.g., controller 900) is configured into a receive only mode (e.g., a slave device mode) to listen to the information received from the datalink. In this way, if a master is connected to the bus (e.g., system bus 602) and sends data through the bus, the controller receives the information and can determine if the selected protocol and datalink parameters match that of the bus and any devices connected to the bus.

Process 1200 includes waiting until data is received from the bus or until the controller has waited for a predetermined amount of time (e.g., the detection time) and not received data through the datalink (step 1214), according to some embodiments. In some embodiments, if the predetermined amount of time has not been reached, the controller continues waiting to receive serial data through the datalink (step 1216). If the controller receives data through the datalink which indicates that the communications protocol and the datalink parameters are correct, or if the controller reaches the predetermined amount of time without receiving serial data which indicates that the communications protocol and the datalink parameters are correct, the controller breaks (step 1218) from performing step 1208. If the controller receives serial data through the datalink which indicates that the correct communications protocol and datalink parameters are selected, the controller breaks out of step 1208 as well as step 1206. If, however, the controller waits the predetermined amount of time and does not receive serial data which indicates that the correct communications protocol and datalink parameters are selected, the controller proceeds to either the next datalink parameters or proceeds to the next communications protocol. In this way, the controller repeats steps 1208 and 1206 until either the correct communications protocol and datalink parameters have been determined or all of the communications protocols and datalink parameters have been ruled out as possible communications protocols/datalink parameters of the bus.

If the controller determines the correct communications protocol and datalink parameters, the correct communications protocol and datalink parameters are saved to a database (e.g., slave protocol database 937) (step 1220), process 1200 is ended (step 1222), and the controller may continue communicating with the bus. If, however, after process 1200 has been completed (e.g., all the possible combinations of communications protocols and datalink parameters have been attempted, and it is determined that the bus does not communicate according to any of the predefined communications protocols/datalink parameters), the controller proceeds to the master protocol detection process, according to some embodiments.

Referring now to FIGS. 13a-b, process 1300 illustrates the slave protocol detection process in greater detail, according to some embodiments. In some embodiments, process 1300 is a detailed illustration of process 1200. In some embodiments, process 1300 is performed by any of controller 900, field controllers 604, BAS controller 366, AHU controller 330, etc., any other controller configured to perform process 1300 and/or process 1200, or any controller connected to a bus.

Process 1300 includes starting the slave protocol detection process (step 1302), according to some embodiments. In some embodiments, step 1302 is step 1202 of process 1200. After process 1300 has been started, process 1300 includes determining if the last active protocol is available (step 1304), according to some embodiments. If there is no last active protocol available (e.g., if it is the first time performing process 1300 or if a protocol from a previous run-through of process 1300 has not been saved), the first protocol is selected (step 1308), according to some embodiments. If, however, a protocol has been saved in memory of the controller, the initial protocol is set to the last active protocol (step 1306), according to some embodiments. Advantageously, if the last time the controller was connected to a bus, it was determined that the bus communicated according to a specific communications protocol, time may be saved by initially selecting that protocol (e.g., if the controller is disconnected and reconnected, it may save time to initially check the communications protocol it communicated with upon disconnection), according to some embodiments. Upon selecting the communications protocol, a protocol timer is started (step 1308), according to some embodiments. In some embodiments, the protocol timer is configured to run for a predetermined protocol duration.

Process 1300 includes selecting datalink parameters and starting a datalink timer (step 1310), according to some embodiments. In some embodiments, the datalink timer is configured to run for a predetermined datalink duration. Process 1300 includes listening to the bus with the configured datalink (step 1312), according to some embodiments. The controller continues to listen to the bus with the configured datalink until either a datalink event occurs (e.g., serial data is received from the bus) or until the datalink timer reaches the predetermined datalink duration or until the protocol timer reaches the predetermined protocol duration. When either a datalink event occurs or at least one of the datalink timer and the protocol timer has reached its predetermined duration (e.g., a time-out event), either the datalink event or the time-out event are stored in memory, according to some embodiments. In some embodiments, the datalink event and/or the time-out event are stored in slave protocol database 937 (step 1314). In some embodiments, the data received through the bus and corresponding communications protocol and datalink parameters are saved in slave protocol database 937. In some embodiments, the data received through the bus when a datalink event occurs is a data packet.

Process 1300 includes checking if a correct data packet has been received, according to some embodiments. In some embodiments, the data packet received from the bus is analyzed to determine if the correct communications protocol and/or datalink parameters have been identified (step 1316). In some embodiments, the data packet received is analyzed to determine if it matches a protocol format of the current communications protocol. If the correct data packet has been received, the controller determines if additional data packets are needed (e.g., if a number of correct data packets is less than the data threshold) (step 1320), according to some embodiments. If additional data packets are needed to meet the data threshold to validate that the correct communications protocol and datalink parameters have been selected, the controller continues listening to the datalink to receive data from the bus (e.g., returns to step 1312), according to some embodiments. If the data threshold has been met (e.g., if a sufficient amount of correct data packets are received), the currently selected communications protocol and datalink parameters are determined to be the correct communications protocol and datalink parameters, and the currently selected communications protocol and datalink parameters are saved to a database (e.g., slave protocol database 937) (step 1322), according to some embodiments. In some embodiments, the correct communications protocol and datalink parameters are saved as the last active protocol and may be used as a starting point for future implementations of process 1300. In response to identifying the correct communications protocol and datalink parameters, process 1300 is ended (step 1328) and the controller is configured to continue communicating with the bus, according to some embodiments.

If, however, the correct packet is not received, or if the data threshold is not met, and the datalink time has expired (step 1318), the next datalink parameters are set (steps 1324-1310), and steps 1312-1322 are repeated until either the correct communications protocol and datalink parameters are identified or until the next datalink parameters are ruled out, according to some embodiments. This process is repeated until all of the possible predefined datalink parameters have been ruled out, or until one of the possible predefined datalink parameters is identified as the correct datalink parameters for the currently selected communications protocol. If all of the predefined datalink parameters are ruled out, and there are still communications protocols (step 1326) which have not been checked, process 1300 returns to step 1308, and repeats steps 1308-1326 until either the correct communications protocol and datalink parameters are identified, or until the entire list of communications protocols and datalink parameters are exhausted (e.g., ruled out), according to some embodiments. If all of the communications protocols and datalink parameters are exhausted, process 1300 ends (step 1328), according to some embodiments. In some embodiments, the controller is transitioned into a master device mode and process 1300 proceeds to either of process 1400 and/or process 1500.

Master Protocol Detection Process

Referring now to FIGS. 14-15*b*, process 1400 and process 1500 show master protocol detection process in greater detail, according to some embodiments. In some embodiments, process 1400 and process 1500 are different processes. In some embodiments, process 1500 is a detailed description of process 1400. Any steps of either process 1400 or process 1500 may be performed by a controller (e.g., controller 900, field controllers 604, BAS controller 366, AHU controller 230, etc., or any other controller configured to perform either of process 1400 or process 1500), according to some embodiments. In some embodiments, either of process 1400 or process 1500 are performed by any of protocol detection manager 916, master protocol detection module 920, and master protocol database 939.

Referring now to FIG. 14, process 1400 is shown, according to some embodiments. Process 1400 is shown to include starting the master protocol detection process (step 1402), according to some embodiments. In some embodiments, step 1402 of process 1400 is step 1010 of process 1000. Process 1400 is shown to include configuring the datalink of the controller (step 1406), according to some embodiments. In some embodiments, configuring the datalink of the controller includes configuring the controller to communicate with the bus according to one of the master communications protocols with specific datalink parameters. In some embodiments, configuring the datalink includes transitioning the controller into a master mode, such that the controller functions as a master device of the bus to which it is connected.

Process 1400 includes waiting for "silent" datalink communications (step 1406), according to some embodiments. In some embodiments, waiting for the silent datalink communications includes waiting for a predetermined amount of time and receiving any serial data from the bus. In some embodiments, the predetermined amount of time which the controller waits for is the detection time plus a time duration. In some embodiments, the time duration is relatively small compared to the detection time. In some embodiments, the time duration is randomly determined in order to ensure that if another master device is connected to the bus, that the controller and the other master device do not begin sending communications at the same time.

Process 1400 includes sending a protocol request (step 1408) in response to no bus communications being received over the predetermined amount of time. In some embodiments, the protocol request is a command to any slave devices connected to the bus to answer back with a protocol response. If the correct communications protocol and datalink parameters are selected, the slave devices connected to the bus receive the protocol request and answer back with the protocol response, according to some embodiments. If the communications protocol and/or the datalink parameters are not correct, the slave devices are unable to receive and/or process the protocol request and do not respond with the protocol response, according to some embodiments.

In some embodiments, process 1400 includes waiting a predetermined amount of time for the protocol response. If the controller does not receive the protocol response, the controller may determine that the currently selected communications protocol and/or the currently selected datalink parameters are not the correct communications protocol and/or datalink parameters. In some embodiments, if the controller does not receive the protocol response for the currently selected communication protocol and datalink parameters, the datalink parameters are changed to the next datalink parameters, and steps 1404-1410 are repeated. This is repeated until all possible datalink parameters are exhausted for a particular communications protocol or until the correct combination of communications protocol and datalink parameters are determined. If all datalink parameters for a communications protocol are exhausted without identification of the correct communications protocol/datalink parameters, the next communications protocol is selected, and the process is repeated for the next communications protocol (e.g., steps 1404-1410 and changing the datalink parameters in response to not identifying the correct communications protocol/datalink parameters), according to some embodiments. This is repeated for all communications protocols and all datalink parameters for each communications protocol until either the correct communications protocol/datalink parameters are determined or until all possible combinations of communications protocol/datalink parameters are exhausted. In response to receiving a protocol response, process 1400 includes updating the results (step 1412), according to some embodiments. In some embodiments, updating the results includes saving the correct communications protocol/datalink parameters in a database (e.g., master protocol database 939). In some embodiments, process 1400 includes ending process 1400 (step 1414) and configuring the controller to continue communicating with the bus according to the correct communications protocol and datalink parameters.

Referring now to FIGS. 15*a*-*b*, process 1500 illustrates master protocol detection process, according to some embodiments. In some embodiments, process 1500 is a detailed view of process 1400. Process 1500 is shown to include starting process 1500 (step 1502), according to some embodiments. In some embodiments, step 1502 of process 1500 is step 1402 of process 1400. Process 1500 is shown to include selecting datalink parameters (step 1504), according to some embodiments. In some embodiments, process 1500 also includes selecting a communications protocol (not shown). In some embodiments, step 1504 of process 1500 is step 1404 of process 1400.

Process 1500 includes starting an active request timer (step 1508), according to some embodiments. In some embodiments, the active request timer is configured to run for a predetermined active request time duration. Process 1500 includes listening to information received from the bus via the datalink (step 1510), according to some embodiments. In some embodiments, step 1510 of process 1500 is step 1406 of process 1400. In some embodiments, if the controller receives data from the bus through the datalink, the controller stores the data in a database (e.g., master protocol database 939) (step 1512). When the active request timer reaches the predetermined active request time duration (step 1514), the controller sends a protocol request (step 1516), according to some embodiments. In some embodiments, step 1516 of process 1500 is step 1408 of process 1400. The protocol request is a request for any slave devices connected to the bus to answer back with a protocol response, according to some embodiments. Process 1500 also includes starting a response timer (step 1516), according to some embodiments. In some embodiments, the response timer is configured to run for a predetermined response time duration. If the protocol request is sent correctly (step 1516), the controller listens for the protocol response (step 1520), according to some embodiments. If the protocol request is not sent correctly, a log that the currently selected communication protocol/datalink parameters are incorrect (step 1530) is stored in a database (e.g., master protocol database 939), according to some embodiments. In some embodiments, process 1200 reconfigures the controller to connect to the bus with a different communications protocol and/or different datalink parameters in response to determining that the current communications protocol/datalink parameters are incorrect (step 1530) and resumes at step 1504 with the new communications protocol and/or new datalink parameters.

If the controller receives a protocol response from a slave device connected to the bus, the controller saves the protocol response in a database (step 1522), such as master protocol database 939, according to some embodiments. If the protocol response is received before the response timer reaches the predetermined response time duration (step 1524) and the protocol response is correct (step 1526), the correct communications protocol and datalink parameters have been identified and the correct communications protocol and datalink parameters are stored in a database (step 1528), according to some embodiments. In some embodiments, the controller is configured to communicate with the bus according to the determined communications protocol and the datalink parameters and process 1500 is ended (step 1532) in response to determining the correct communications protocol and datalink parameters. In some embodiments, the controller is configured to identify errors. Identified errors include, but are not limited to, incorrect protocol responses, incorrectly formatted protocol responses, incorrectly sent protocol requests, communications errors, bad parity, framing errors, etc., according to some embodiments. In some embodiments, communications errors such as bad parity, framing errors, etc., are treated as incorrectly received data. In some embodiments, if the number of received errors (e.g., a particular type of error, a particular genus of error, communications errors, etc.) exceeds the error threshold value while any of processes 1200-1500 are being performed, the current communications protocol and datalink parameters are assumed to be incorrectly configured, and any of processes 1200-1500 proceed with different communications protocols and/or different datalink parameters. In some embodiments, the error threshold value is based on the communications protocol being tested for.

In some embodiments, if the controller does not receive a protocol response or if the received protocol response is malformed, the controller is configured to resend the protocol request (e.g., repeat steps 1516-1530) a predetermined number of times (e.g., the number of retries) to ensure that a false negative (e.g., a determination that the current communication protocol and datalink parameters are incorrect) does not occur.

In some embodiments, process 1500 is performed by a controller wiredly connected to a bus (e.g., FIG. 8). In some embodiments, process 1500 is performed by a controller wiredly connected to a wireless transceiver (e.g., FIG. 9). If process 1500 is performed by a controller wiredly connected to a wireless transceiver as shown in FIG. 9, the protocol request may be received and responded by the wireless transceiver (e.g., a wireless co-processor) it is connected to.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for equipment, the controller comprising:
a communications interface connected to at least one of a serial bus and a wireless communications device; and
processing circuitry configured to:
communicate via at least one of the serial bus and the wireless communications device according to a communications protocol and a predetermined parameter;
test for a plurality of predefined communications protocols and predetermined parameters to identify a communications protocol and parameter used by at least one of the serial bus and the wireless communications device, the plurality of predetermined parameters comprising at least one of a baud rate, a parity, a number of data bits, start bits, or stop bits, and the plurality of predefined communications protocols each being a master, a master-slave, or a slave communications protocol; and
use the identified communications protocol and parameter used by the at least one of the serial bus and the wireless communications device to generate protocol-specific control signals or communication signals for the equipment and use the protocol-specific control signals or communication signals to control the equipment or communicate with the equipment;
wherein the processing circuitry uses a set of master communications protocols and a set of slave communications protocols to communicate via at least one of the serial bus and the wireless communications device, wherein the master communications protocols are communications protocols for which the controller is a master device and the slave communications protocols are communications protocols for which the controller is a slave device and wherein the processing circuitry is configured to transition the controller into a slave device mode and perform a slave protocol test for each of the slave communications protocols to identify the communications protocol used by at least one of the serial bus and wireless communications device;
wherein the slave protocol test comprises:
selecting one of the slave communications protocols and one of the predetermined parameters;
configuring the controller to communicate according to the selected slave communications protocol and the selected predetermined parameter;
receiving data through the communications interface;
determining if the received data corresponds to the selected slave communications protocol and the selected predetermined parameter;
storing the selected slave communications protocol and predetermined parameter, if it is determined that the received data corresponds to the selected slave communications protocol and the selected predetermined parameter;
selecting another of the predetermined parameters;
reconfiguring the controller to communicate according to the selected slave communications protocol with the another selected predetermined parameter; and
repeating the steps of receiving data, determining if the received data corresponds to the slave communications protocol and the predetermined parameter, selecting another of the predetermined parameters, and reconfiguring the controller, until all of the predetermined parameters have been tested for the selected slave communications protocol, or until the selected slave communications protocol and the selected predetermined parameter are determined to correspond to the received data.

2. The controller of claim 1, wherein the plurality of predetermined parameters comprise all of the baud rate, the parity, the number of data bits, the start bits, and the stop bits.

3. The controller of claim 1, wherein the processing circuitry further includes a set of the predetermined parameter for each of the slave communications protocols and master communications protocols.

4. The controller of claim 1, wherein the processing circuitry is configured to transition the controller into a master device mode and perform a master protocol test for each of the master communications protocols to identify the communications protocol used by at least one of the serial bus and wireless communications device.

5. The controller of claim 4, wherein the master protocol test comprises:
  selecting one of the master communications protocols and one of the predetermined parameters;
  configuring the controller to communicate according to the selected master communications protocol and predetermined parameter;
  waiting a first predetermined amount of time;
  sending a second protocol request to the at least one of the serial bus and the wireless communications device through the communications interface;
  waiting a second predetermined amount of time for a protocol response;
  receiving the protocol response through the communications interface;
  determining if the received protocol response corresponds to the selected master communications protocol and the selected predetermined parameter;
  storing the selected master communications protocol and the selected predetermined parameter, if the received protocol response corresponds to the selected master communications protocol and the selected predetermined parameter;
  selecting another of the predetermined parameters;
  reconfiguring the controller to communicate according to the selected master communications protocol and the other selected predetermined parameter;
  repeating the steps of waiting the first predetermined amount of time, sending the second protocol request, waiting the second predetermined amount of time, determining if the received protocol response corresponds to the selected master communications protocol and the selected predetermined parameter, storing the selected master communications protocol and the selected predetermined parameter, and selecting another of the predetermined parameters until all of the predetermined parameters have been tested for the selected master communications protocol, or until the selected master communications protocol and the selected predetermined parameter are determined to correspond to the received protocol response.

6. A method for determining a communications protocol and one or more datalink parameters of a serial communications system for a controller connected to the serial communications system, the method comprising:

performing a slave communications protocol detection test for each of one or more predefined slave communications protocols, wherein the slave communications protocol detection test comprises transitioning the controller into a slave device mode and receiving information from the serial communications system to identify the communications protocol and one or more datalink parameters used by the serial communications system;

if the communications protocol and one or more datalink parameters of the serial communications system are not determined by performing the slave communications protocol detection test, performing a master communications protocol detection test for each of one or more predefined master communications protocols, wherein the master communications protocol detection test comprises transitioning the controller into a master device mode and sending a first protocol request to the serial communications system and waiting for a response from the serial communications system to identify the communications protocol and one or more datalink parameters of the serial communications system;

configuring the controller to communicate with the serial communications system according to the identified communications protocol and one or more datalink parameters, if either of the slave communications protocol detection test or the master communications protocol detection test identify the communications protocol and one or more datalink parameters used by the serial communications system; and using the identified communications protocol and one or more datalink parameters to generate protocol-specific control signals or communication signals for equipment and use the protocol-specific control signals or communication signals to control the equipment or communicate with the equipment.

7. The method of claim 6, wherein the set of one or more datalink parameters is at least one of a baud rate, a parity, a number of data bits, start bits, or stop bits.

8. The method of claim 6, wherein the slave communications protocol detection test further comprises:
  selecting a slave communications protocol and a set of one or more datalink parameters;
  configuring the controller to communicate according to the selected slave communications protocol and the set of one or more datalink parameters;
  receiving data from the serial communications system;
  determining if the received data corresponds to the selected slave communications protocol and the selected set of the one or more datalink parameters;
  if the received data corresponds to the selected slave communications protocol and the selected set of the one or more datalink parameters:
  storing the selected slave communications protocol and the selected set of the one or more datalink parameters;
  communicating with the serial communications system according to the selected slave communications protocol and the selected set of the one or more datalink parameters; and
  ending the slave communications protocol detection test; and
  if the received data does not correspond to the selected slave communications protocol and the selected set of the one or more datalink parameters:
  selecting another set of one or more datalink parameters; and repeating the steps of configuring the controller, receiving data, determining if the received data corresponds to the selected slave communications protocol and the selected set of the one or more datalink parameters, until either a list of sets of the one or more datalink parameters are exhausted or the received data corresponds to the selected slave communications protocol and the selected set of one or more datalink parameters.

9. The method of claim 8, wherein the slave communications protocol detection test further comprises waiting for a predetermined time duration to receive data from the serial communications system.

10. The method of claim 8, wherein the slave communications protocol detection test further comprises waiting for and receiving additional data from the serial communications system if a required amount of data is not received, in response to determining that the received data corresponds to the selected slave communications protocol and the selected set of the one or more datalink parameters.

11. The method of claim 8, wherein storing the selected slave communications protocol and the selected set of the one or more datalink parameters further comprises saving the selected slave communications protocol and the selected set of the one or more datalink parameters as a last active protocol for future use.

12. The method of claim 6, wherein the master communications protocol detection test comprises:
selecting a master communications protocol and a set of one or more datalink parameters;
configuring the controller to communicate according to the selected master communications protocol and the selected set of the one or more datalink parameters;
receiving any data from the serial communications system for a time duration;
sending a second protocol request in response to the time duration ending;
receiving a protocol response from the serial communications system;
determining if the received protocol response corresponds to the selected master communications protocol and the selected set of the one or more datalink parameters;
if the received protocol response corresponds to the selected master communications protocol and the selected set of the one or more datalink parameters:
storing the selected master communications protocol and the selected set of the one or more datalink parameters;
communicating with the serial communications system according to the selected slave communications protocol and the selected set of the one or more datalink parameters; and
ending the master communications protocol detection test; and
if the received protocol response does not correspond to the selected master communications protocol and the selected set of the one or more datalink parameters:
selecting another set of one or more datalink parameters; and
repeating the steps of configuring the controller, sending the second protocol request, receiving the protocol response, determining if the received protocol response corresponds to the selected slave communications protocol and the selected set of the one or more datalink parameters, and selecting another set of one or more datalink parameters, until either a list of sets of the one or more datalink parameters are exhausted or the received protocol response corresponds to the selected master communications protocol and the selected set of the one or more datalink parameters.

13. The method of claim 12, wherein the time duration comprises a predetermined time amount and a random time amount.

14. The method of claim 12, wherein storing the selected master communications protocol and the selected set of the one or more datalink parameters further comprises saving the selected master communications protocol and the set of one or more datalink parameters as a last active protocol for future use.

15. The method of claim 12, wherein the master communications protocol detection test further comprises determining if the second protocol request is successfully sent in response to sending the second protocol request.

16. The method of claim 6, wherein the method is performed by the controller in response to at least one of the controller being started, the controller being connected to the serial communications system, and a manual command to initiate the method.

17. The method of claim 6, wherein the serial communications system is at least one of a system bus and a wireless communications device.

18. The method of claim 6, wherein the controller is configured to communicably connect with the serial communications system with an RS-485 interface.

* * * * *